US010511867B2

(12) United States Patent
Tsukagoshi

(10) Patent No.: US 10,511,867 B2
(45) Date of Patent: Dec. 17, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/533,262

(22) PCT Filed: Dec. 16, 2015

(86) PCT No.: PCT/JP2015/085140
§ 371 (c)(1),
(2) Date: Jun. 5, 2017

(87) PCT Pub. No.: WO2016/098790
PCT Pub. Date: Jun. 23, 2016

(65) Prior Publication Data
US 2017/0347137 A1    Nov. 30, 2017

(30) Foreign Application Priority Data
Dec. 19, 2014  (JP) ................ 2014-258054

(51) Int. Cl.
*H04N 21/236* (2011.01)
*H04N 21/434* (2011.01)
*H04N 21/488* (2011.01)

(52) U.S. Cl.
CPC . *H04N 21/23614* (2013.01); *H04N 21/23605* (2013.01); *H04N 21/434* (2013.01); *H04N 21/4348* (2013.01); *H04N 21/4884* (2013.01)

(58) Field of Classification Search
CPC .......... H04N 21/2362; H04N 21/4884; H04N 21/235; H04N 21/435; H04N 21/6131;
(Continued)

(56) References Cited

U.S. PATENT DOCUMENTS

2004/0184780 A1* 9/2004 Seo .................. G11B 27/034
386/241
2013/0162772 A1* 6/2013 Tsukagoshi .......... H04N 21/816
348/43
(Continued)

FOREIGN PATENT DOCUMENTS

JP    2012-169885 A    9/2012

OTHER PUBLICATIONS

"MMT-Based Media Transport Scheme in Digital Broadcasting Systems", ARIB STD-B60 Version.1.0, Jul. 31, 2014, 15 pages.
"Multimedia Coding Specification for Digital Broadcasting (Second Generation)", ARIB STD-B62 Version.1.0-E1, Jul. 31, 2014, vol. 1, pp. 95.
"MMT-Based Media Transport Scheme in Digital Broadcasting Systems", ARIB STD-B60 Version .1.0, Jul. 31, 2014, pp. 4, 111-121.
(Continued)

*Primary Examiner* — Nicholas T Corbo
(74) *Attorney, Agent, or Firm* — Chip Law Group

(57) ABSTRACT

Display timing control of subtitles is to be excellently performed on a reception side. A video stream having coded image data is generated. A subtitle stream having text information on the subtitles and display timing information is generated. A transport stream containing the video stream and the subtitle stream is transmitted. For example, the display timing information on the subtitles contains information on display start timing and display duration.

5 Claims, 22 Drawing Sheets

(58) Field of Classification Search
CPC ........... H04N 21/4356; H04N 21/8126; H04N 21/462; H04N 21/23614; H04N 21/23605; H04N 21/434; H04N 21/4348
USPC ...... 725/137, 62, 110, 93, 54, 32, 29, 75, 34
See application file for complete search history.

(56) References Cited

U.S. PATENT DOCUMENTS

| | | | | |
|---|---|---|---|---|
| 2014/0078248 A1* | 3/2014 | Tsukagoshi | .......... | H04N 13/167 348/43 |
| 2014/0310762 A1* | 10/2014 | Dewa | ................ | H04N 21/4884 725/137 |
| 2017/0180767 A1* | 6/2017 | Oh | ................... | H04N 21/23614 |

OTHER PUBLICATIONS

"Multimedia Coding Specification for Digital Broadcasting (Second Generation)", ARIB STD-B62 Version.1.0-E1, Jul. 31, 2014, vol. 1, pp. 59-82.

"MMT-Based Media Transport Scheme in Digital Broadcasting Systems", ARIB STD-B60 Ver.1.0, Association of Radio Industries and Businesses, Jul. 2014, pp. 4, 111 to 121.

"Multimedia Coding Specification for Digital Broadcasting (Second Generation)", ARIB STD B62 Ver.1.0 (separate vol. 1), Association of Radio Industries and Businesses, Jul. 31, 2014, pp. 59-82.

International Search Report and Written Opinion of PCT Application No. PCT/JP2015/085140, dated Mar. 22, 2016, 01 pages of English Translation and 05 pages of ISRWO.

* cited by examiner

FIG. 1
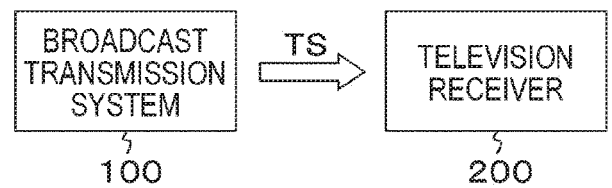
FIG. 2
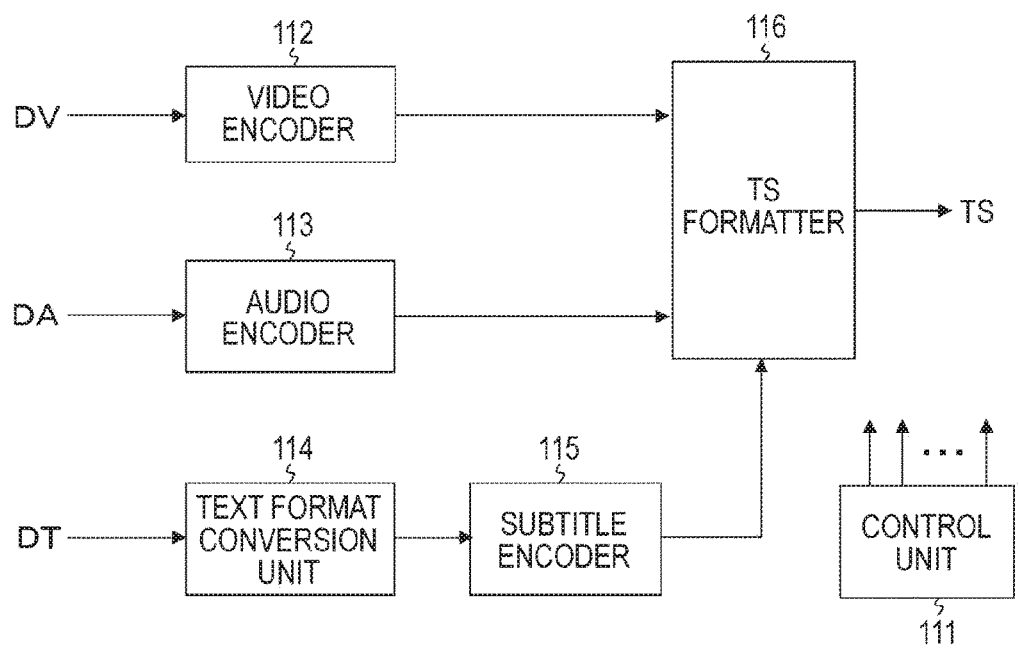
FIG. 3
TTML STRUCTURE
```
<tt xml:lang="" xmlns="http://www.w3.org/ns/ttml">
  <head>
    <metadata/>
    <styling/>
    <layout/>
  </head>
  <body/>
</tt>
```

FIG. 4(a)

TTML Metadata (TTM)

```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

FIG. 4(b)

TTML Styling (TTS)

```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

FIG. 4(c)

TTML Layout (region)

```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

| Syntax | Size | Type |
|---|---|---|
| text_header_metadata_segment() { | | |
| sync_byte | 8 | bslbf |
| segment_type | 8 | bslbf |
| page_id | 16 | bslbf |
| segment_length | 16 | uimsbf |
| segment_payload() | | |
| } | | | segment_type=0x21 INDICATES text_header_metadata_segment.

FIG. 7(a)

```
<metadata xmlns:ttm="http://www.w3.org/ns/ttml#metadata">
  <ttm:title>Timed Text TTML Example</ttm:title>
  <ttm:copyright>The Authors (c) 2006</ttm:copyright>
</metadata>
```

FIG. 7(b)

| Syntax | Size | Type |
|---|---|---|
| text_header_styling_segment() { | | |
| sync_byte | 8 | bslbf |
| segment_type | 8 | bslbf |
| page_id | 16 | bslbf |
| segment_length | 16 | uimsbf |
| segment_payload() | | |
| } | | | segment_type=0x22 INDICATES text_header_styling_segment.

FIG. 8(a)

```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

| Syntax | Size | Type |
|---|---|---|
| text_header_layout_segment() { | | |
| sync_byte | 8 | bslbf |
| segment_type | 8 | bslbf |
| page_id | 16 | bslbf |
| segment_length | 16 | uimsbf |
| segment_payload() | | |
| } | | | segment_type=0x23 INDICATES text_header_layout_segment.

FIG. 9(b)

```
<layout xmlns:tts="http://www.w3.org/ns/ttml#styling">
  <region xml:id="subtitleArea"
          style="s1"
          tts:extent="560px 62px"
          tts:padding="5px 3px"
          tts:backgroundColor="black"
          tts:displayAlign="after"
  />
</layout>
```

| Syntax | Size | Type |
|---|---|---|
| text_body_segment() { | | |
|   sync_byte | 8 | bslbf |
|   segment_type | 8 | bslbf |
|   page_id | 16 | bslbf |
|   segment_length | 16 | uimsbf |
|   segment_payload() | | |
| } | | | segment_type=0x24 INDICATES text_body_segment.

FIG. 10(a)

```
<body region="subtitleArea">
  <div>
    <p xml:id="subtitle1" begin="0.76s" end="3.45s">
    It seems a paradox, does it not,
    </p>
    <p xml:id="subtitle2" begin="5.0s" end="10.0s">
    that the image formed on<br/>
    the Retina should be inverted?
    </p>
    <p xml:id="subtitle3" begin="10.0s" end="16.0s" style="s2">
    It is puzzling, why is it<br/>
    we do not see things upside-down?
    </p>
  </div>
</body>
```

FIG. 10(b)

| Syntax | Size | Type |
|---|---|---|
| text_whole_segment() { | | |
| sync_byte | 8 | bslbf |
| segment_type | 8 | bslbf |
| page_id | 16 | bslbf |
| segment_length | 16 | uimsbf |
| segment_payload() | | |
| } | | | segment_type=0x25 INDICATES text_whole_segment.

FIG. 11(a)

```
<tt xml:lang="" xmlns="http://www.w3.org/ns/ttml">
  <head>
    <metadata/>
    <styling/>
    <layout/>
  </head>
  <body/>
</tt>
```

| Syntax | Size | Type |
|---|---|---|
| timing_control_segment() { | | |
|   sync_byte | 8 | bslbf |
|   segment_type | 8 | bslbf |
|   page_id | 16 | bslbf |
|   segment_length | 16 | uimsbf |
|   format_type | 8 | bslbf |
|   number_of_regions | 8 | uimsbf |
|   for (i=0; i< number_of_regions; i++) { | | |
|     region_id | 16 | uimsbf |
|     number_of_display_set | 8 | uimsbf |
|     for (j=0; j< number_of_display_set; j++) { | | |
|       display offset | 16 | uimsbf |
|       display duration | 16 | uimsbf |
|     } | | |
|   } | | |
| } | | | segment_type=0x20 INDICATES timing_control_segment.
format_type INDICATES TYPE OF SUBTITLE TRANSMISSION FORMAT.
1: DVB subtitle , 2: EBU-TT-D , 3: TTML

TRANSMISSION APPARATUS, TRANSMISSION METHOD, RECEPTION APPARATUS, AND RECEPTION METHOD

CROSS REFERENCE TO RELATED APPLICATIONS

This application is a U.S. National Phase of International Patent Application No. PCT/JP2015/085140 filed on Dec. 16, 2015, which claims priority benefit of Japanese Patent Application No. JP 2014-258054 filed in the Japan Patent Office on Dec. 19, 2014. Each of the above-referenced applications is hereby incorporated herein by reference in its entirety.

TECHNICAL FIELD

The present technology relates to a transmission apparatus, a transmission method, a reception apparatus, and a reception method, and specifically relates to a transmission apparatus or the like which transmits text information together with video information.

BACKGROUND ART

In, for example, digital video broadcasting (DVB), information on subtitles has been transmitted as bitmap data. Recently, it has been proposed that information on subtitles is transmitted as a text character code, that is, on a text basis. In this case, the font is expanded according to the resolution on a reception side.

Furthermore, it has been proposed that text information is to have timing information when information on subtitles is transmitted on a text basis. As this text information, for example, a timed text markup language (TTML) is proposed by the World Wide Web Consortium (W3C) (see Patent Document 1).

CITATION LIST

Patent Document

Patent Document 1: Japanese Patent Application Laid-Open No. 2012-169885

SUMMARY OF THE INVENTION

Problems to be Solved by the Invention

A purpose of the present technology is to excellently perform display timing control of subtitles on a reception side.

Solutions to Problems

A concept of the present technology is a transmission apparatus including:

a video encoder which generates a video stream having coded image data;

a subtitle encoder which generates a subtitle stream having text information and display timing information on subtitles; and a transmission unit which transmits a transport stream containing the video stream and the subtitle stream.

In the present technology, the video stream having the coded image data is generated by the video encoder. The subtitle stream having the text information and the display timing information on the subtitles is generated by the subtitle encoder. Then, the transport stream containing the video stream and the subtitle stream is transmitted by the transmission unit.

For example, the subtitle encoder may generate the subtitle stream on the basis of the text information on the subtitles in a predetermined format having the display timing information. In this case, for example, the text information on the subtitles in the predetermined format may be in a timed text markup language (TTML) or in a derivative format of the TTML.

Furthermore, for example, the display timing information on the subtitles may have information on, at least, display start timing and display duration. In this case, for example, the subtitle stream may be constituted by a PES packet constituted by a PES header and a PES payload, the text information and the display timing information on the subtitles may be arranged in the PES payload, and the display start timing may be indicated by a display offset from a presentation time stamp (PTS) inserted in the PES header.

In the present technology, the subtitle stream having the text information and the display timing information on the subtitles is transmitted together with the video stream. Thus, it is possible to excellently perform display timing control of subtitles on a reception side.

Furthermore, another concept of the present technology is a reception apparatus including:

a reception unit which receives a transport stream containing a video stream having coded image data and a subtitle stream having text information and display timing information on subtitles;

a video decoder which performs decoding processing to the video stream and obtains image data;

a subtitle decoder which performs decoding processing to the subtitle stream and obtains bitmap data of the subtitles and the display timing information on the subtitles; and a display control unit which controls timing to superimpose the bitmap data of the subtitles on the image data on the basis of the display timing information.

In the present technology, the transport stream is received by the reception unit. The transport stream contains the video stream having the coded image data and the subtitle stream having the text information and the display timing information on the subtitles.

The decoding processing is performed to the video stream and the image data is obtained by the video decoder. Furthermore, the decoding processing is performed to the subtitle stream, and the bitmap data of the subtitles and the display timing information on the subtitles are obtained by the subtitle decoder. Then, the timing to superimpose the bitmap data of the subtitles on the image data is controlled by the display control unit on the basis of display timing control information.

For example, the display timing information on the subtitles may have information on, at least, display start timing and display duration. In this case, for example, the subtitle stream may be constituted by a PES packet constituted by a PES header and a PES payload, the text information and the display timing information on the subtitles may be arranged in the PES payload, and the display start timing may be indicated by a display offset from a PTS inserted in the PES header.

In the present technology, the subtitle stream has the text information and the display timing information on the subtitles, and the timing to superimpose the bitmap data of the subtitles on the image data is controlled on the basis of the display timing information. Thus, it is possible to excellently perform display timing control of subtitles.

Effects of the Invention

According to the present technology, it is possible to excellently perform display timing control of subtitles. Note that, the effects described in the present specification are merely exemplified and not limited, and there may be additional effects.

BRIEF DESCRIPTION OF DRAWINGS

FIG. 1 is a block diagram illustrating a configuration example of a transceiver system of an embodiment.

FIG. 2 is a block diagram illustrating a configuration example of a stream generation unit of a broadcast transmission system.

FIG. 3 is a diagram explaining a TTML structure.

FIGS. 4(a) to 4(c) are diagrams illustrating examples of structures of each element of metadata, styling, and layout in the head of the TTML structure.

FIGS. 7(a) and 7(b) are diagrams illustrating examples of structures of a text header metadata segment (THMS).

FIGS. 8(a) and 8(b) are diagrams illustrating examples of structures of a text header styling segment (THSS).

FIGS. 9(a) and 9(b) are diagrams illustrating examples of structures of a text header layout segment (THLS).

FIGS. 10(a) and 10(b) are diagrams illustrating examples of structures of a text body segment (TBS).

FIGS. 11(a) and 11(b) are diagrams illustrating examples of structures of a text whole segment (TWS).

FIG. 12 is a diagram illustrating an example of a structure of a timing control segment (TCS).

MODE FOR CARRYING OUT THE INVENTION

Figures 5, 6:
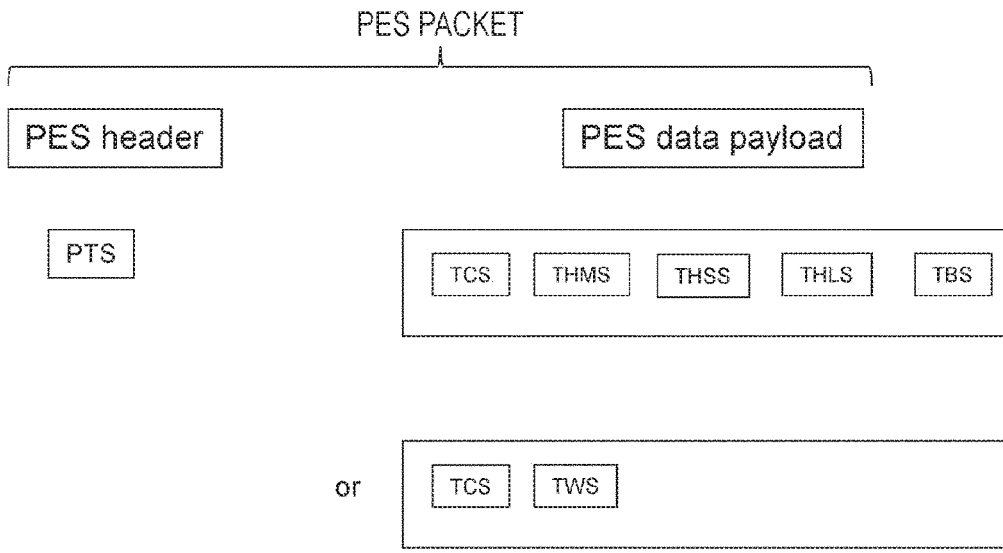
FIG. 5 is a diagram illustrating a configuration example of the body of the TTML structure.
FIG. 6 is a diagram illustrating a configuration example of a PES packet.

Hereinafter, a mode for carrying out the invention (hereinafter, referred to as an "embodiment") is described. Note that, the description is made in the following order:
1. Embodiment
2. Modified Example 1. Embodiment

[Configuration Example of Transceiver System]

FIG. 1 illustrates a configuration example of a transceiver system 10 of an embodiment. The transceiver system 10 includes a broadcast transmission system 100 and a television receiver 200. The broadcast transmission system 100 transmits a transport stream TS on a broadcast wave. The transport stream TS contains a video stream having coded image data, an audio stream having coded audio data, and a subtitle stream having text information and display timing information on subtitles.

The broadcast transmission system 100 generates a subtitle stream on the basis of the text information on the subtitles in a predetermined format having the display timing information. In this embodiment, the text information is, for example, a timed text markup language (TTML) proposed by the World Wide Web Consortium (W3C).

In this embodiment, the display timing information on the subtitles contained in the subtitle stream has information on, at least, display start timing and display duration. Here, the subtitle stream is constituted by a PES packet constituted by a PES header and a PES payload, the text information and the display timing information on the subtitles are arranged in the PES payload, and, for example, the display start timing is indicated by a display offset from a PTS inserted in the PES header.

The television receiver 200 receives the transport stream TS transmitted on a broadcast wave from the broadcast transmission system 100. The transport stream TS contains, as described above, the video stream having the coded image data and the subtitle stream having the text information and the display timing information on the subtitles.

The television receiver 200 receives image data from the video stream, and bitmap data of the subtitles and the display timing information on the subtitles from the subtitle stream. Then, the television receiver 200 controls the timing to superimpose the bitmap data of the subtitle on the image data on the basis of the display timing information, and displays the image on which the subtitles are superimposed.

[Configuration Example of Stream Generation Unit of Broadcast Transmission System]

FIG. 2 illustrates a configuration example of a stream generation unit 110 of the broadcast transmission system 100. The stream generation unit 110 includes a control unit 111, a video encoder 112, an audio encoder 113, a text format conversion unit 114, and a subtitle encoder 115.

The control unit 111 controls the operation of the components in the stream generation unit 110. The video encoder 112 receives image data DV, performs coding to the image data DV, and generates a video stream having the coded image data (PES stream). The audio encoder 113 receives audio data DA, performs coding to the audio data DA, and generates an audio stream having the coded audio data (PES stream).

The text format conversion unit 114 receives text data (character code) DT as information on subtitles, and obtains text information on subtitles in a predetermined format having display timing information. In this embodiment, the text information is converted into the TTML.

FIG. 3 illustrates a TTML structure. The TTML is described on an XML basis. In the head, the elements of metadata, styling, and layout exist. FIG. 4(a) illustrates an example of a structure of the metadata (TTM:TTML Metadata). The metadata contains metadata title information and copyright information.

FIG. 4(b) illustrates an example of a structure of the styling (TTS:TTML Styling). The styling contains an identifier (id) and information on a color, a font (fontFamily), a size (fontSize), an alignment (textAlign), and the like. FIG. 4(c) illustrates an example of a structure of the layout (region:TTML layout). The layout contains an identifier (id) of a region where subtitles are arranged, and information on an area (extent), an offset (padding), a background color (backgroundColor), an alignment (displayAlign), and the like.

FIG. 5 illustrates an example of a structure of the body. In the illustrated example, the information on three subtitles of a subtitle 1 (subtitle1), a subtitle 2 (subtitle2), and a subtitle 3 (subtitle3) is contained. The display start timing, the display end timing, and the text data are described for each subtitle. For example, with regard to the subtitle 1, the display start timing is "0.76 s", the display end timing is "3.45 s", and the text data is "It seems a paradox, dose it not,".

Returning back to FIG. 2, the subtitle encoder 115 converts the TTML obtained by the text format conversion unit 114 into various segments, and generates a subtitle stream constituted by the PES packet in which the segments are arranged in the payload.

FIG. 6 illustrates a configuration example of the PES packet. The PES header contains a presentation time stamp (PTS). Furthermore, the PES payload contains the segments of a timing control segment (TCS), a text header metadata segment (THMS), a text header styling segment (THSS), a text header layout segment (THLS), and a text body segment (TBS), or the segments of a timing control segment (TCS) and a text whole segment (TWS).

FIG. 7(a) illustrates an example of a structure (syntax) of the text header metadata segment (THMS). The syntax contains information on "sync_byte", "segment_type", "page_id", "segment_length", and "segment_payload( )". "segment_type" is 8-bit data indicating a segment type, and is, for example, "0x21" indicating the THMS in this example. "segment_length" is 8-bit data indicating the length (size) of the segment. The metadata illustrated in FIG. 7(b) is arranged in "segment_payload( )" as XML information. The metadata is the same as the elements of the metadata existing in the head of the TTML (see FIG. 4(a)).

FIG. 8(a) illustrates an example of a structure (syntax) of the text header styling segment (THSS). The syntax contains information on "sync_byte", "segment_type", "page_id", "segment_length", and "segment_payload( )". "segment_type" is 8-bit data indicating a segment type, and is, for example, "0x22" indicating the THSS in this example. "segment_length" is 8-bit data indicating the length (size) of the segment. The metadata illustrated in FIG. 8(b) is arranged in "segment_payload( )" as XML information. The metadata is the same as the elements of the styling existing in the head of the TTML (see FIG. 4(b)).

FIG. 9(a) illustrates an example of a structure (syntax) of the text header layout segment (THLS). The syntax contains information on "sync_byte", "segment_type", "page_id", "segment_length", and "segment_payload( )". "segment_type" is 8-bit data indicating a segment type, and is, for example, "0x23" indicating the THLS in this example. "segment_length" is 8-bit data indicating the length (size) of the segment. The metadata illustrated in FIG. 9(b) is arranged in "segment_payload( )" as XML information. The metadata is the same as the elements of the layout existing in the head of the TTML (see FIG. 4(c)).

FIG. 10(a) illustrates an example of a structure (syntax) of the text body segment (TBS). The syntax contains information on "sync_byte", "segment_type", "page_id", "segment_length", and "segment_payload( )". "segment_type" is 8-bit data indicating a segment type, and is, for example, "0x24" indicating the TBS in this example. The metadata illustrated in FIG. 10(b) is arranged in "segment_payload( )" as XML information. The metadata is the same as the body of the TTML (see FIG. 5).

FIG. 11(a) illustrates an example of a structure (syntax) of the text whole segment (TWS). The syntax contains information on "sync_byte", "segment_type", "page_id", "segment_length", and "segment_payload( )". "segment_type" is 8-bit data indicating a segment type, and is, for example, "0x25" indicating the TWS in this example. "segment_length" is 8-bit data indicating the length (size) of the segment. The metadata illustrated in FIG. 11(b) is arranged in "segment_payload( )" as XML information. The metadata is the whole TTML (see FIG. 3). The syntax is to maintain the compatibility in the whole TTML, and to put the whole TTML in one segment.

FIG. 12 illustrates an example of a structure (syntax) of the timing control segment (TCS). The syntax contains information on "sync_byte", "segment_type", "page_id", "segment_length", "format_type", "number_of_regions", "region_id", "number_of_display_set", "display offset", and "display duration". "segment_type" is 8-bit data indicating a segment type, and is, for example, "0x20" indicating the TCS in this example. "segment_length" is 8-bit data indicating the length (size) of the segment.

The 8-bit field of "format_type" indicates a type of a transmission format of subtitles. "1" indicates "DVB subtitle", "2" indicates "EBU-TT-D", and "3" indicates "TTML". In this embodiment, the 8-bit field of "format_type" is to be "2" or "3".

The 8-bit field of "number_of_regions" indicates the number of regions. The 16-bit field of "region_id" indicates an identifier of a region. The 8 bits of "number_of_display_set" indicated the number of displays of the region. The 16-bit field of "display offset" indicates an offset value from the PTS as the display start timing in the region. The 16-bit field of "display duration" indicates the display duration of the region.

Figure 13:
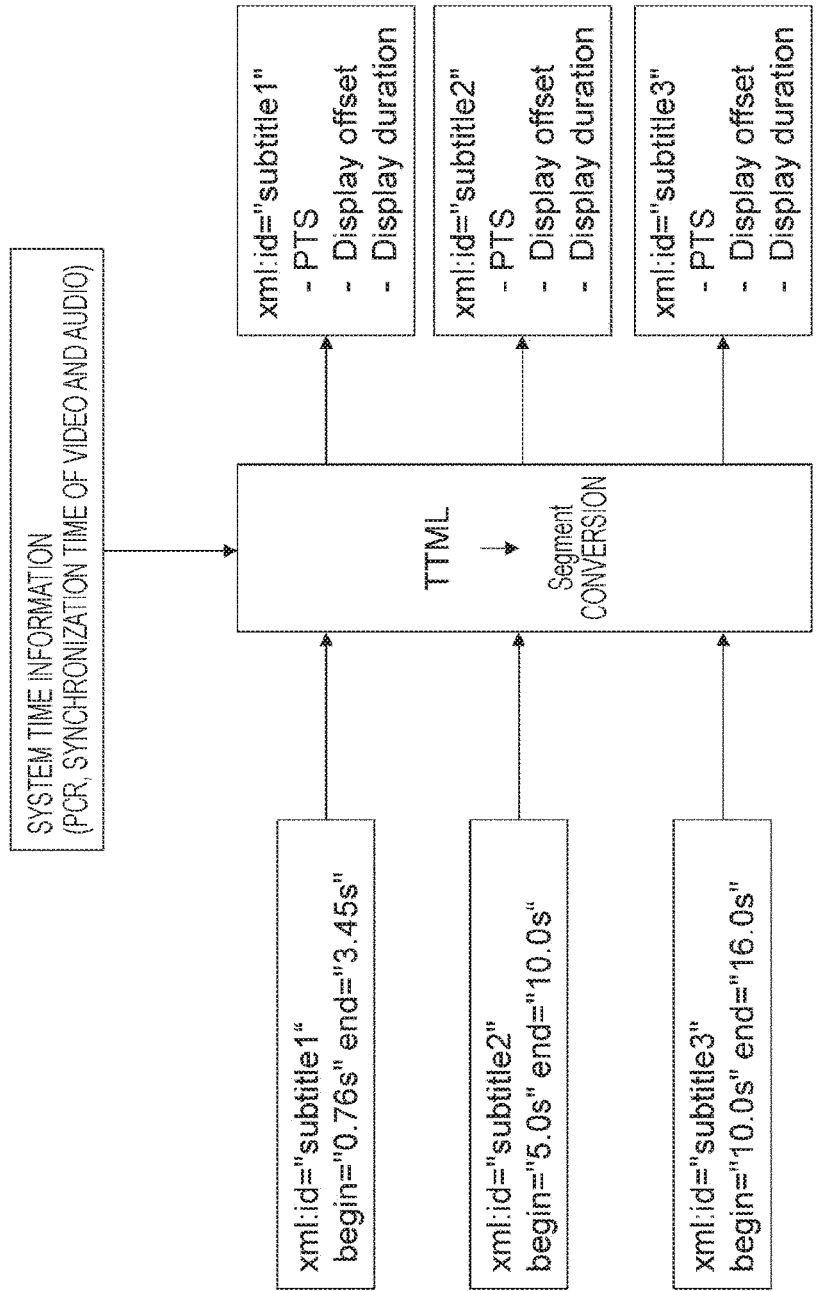
FIG. 13 is a diagram explaining the settings of "PTS", "display offset", and "display duration" when the TTML is converted into a segment.

As illustrated in FIG. 13, when converting the TTML into the segments, the subtitle encoder 115 sets "PTS", "display offset", and "display duration" of each subtitle referring to the system time information (the PCR and the synchronization time of the video and the audio) on the basis of the description on the display start timing (begin) and the display end timing (end) of each subtitle contained in the body of the TTML. At this time, a subtitle segment encoder 115 sets "PTS", "display offset", and "display duration" while verifying that the operation of the reception side is correctly performed using a decoder buffer model.

Figure 14:
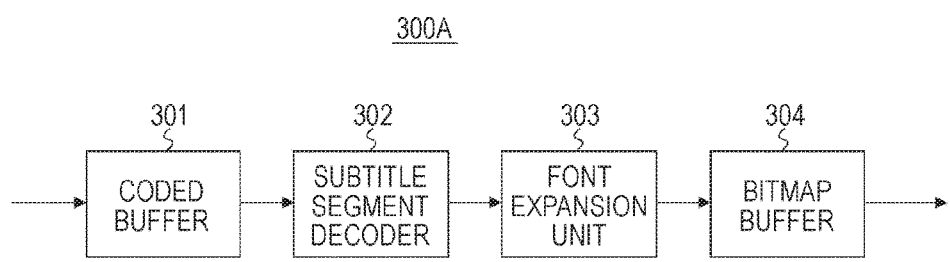
FIG. 14 is a diagram illustrating a configuration example of a decoder buffer model.

FIG. 14 illustrates a configuration example of a decoder buffer model 300A. The decoder buffer model 300A includes a coded buffer 301, a subtitle segment decoder 302, a font expansion unit 303, and a bitmap buffer 304. The coded buffer 301 temporarily holds received segment data.

The subtitle segment decoder 302 performs decoding processing to the segment data of each region held by the coded buffer 301 at a predetermined timing, and obtains the text data and the control code of each region. The font expansion unit 303 expands the font on the basis of the text data and the control code of each region obtained by the subtitle segment decoder 302, and obtains the bitmap data of each region.

The bitmap buffer 304 temporarily holds the bitmap data of each region obtained by the font expansion unit 303 and control information for displaying the bitmap data. The bitmap data of each region held by the bitmap buffer 304 is read from the display start timing, and superimposed on image data, and it lasts for the display duration.

Figure 15:
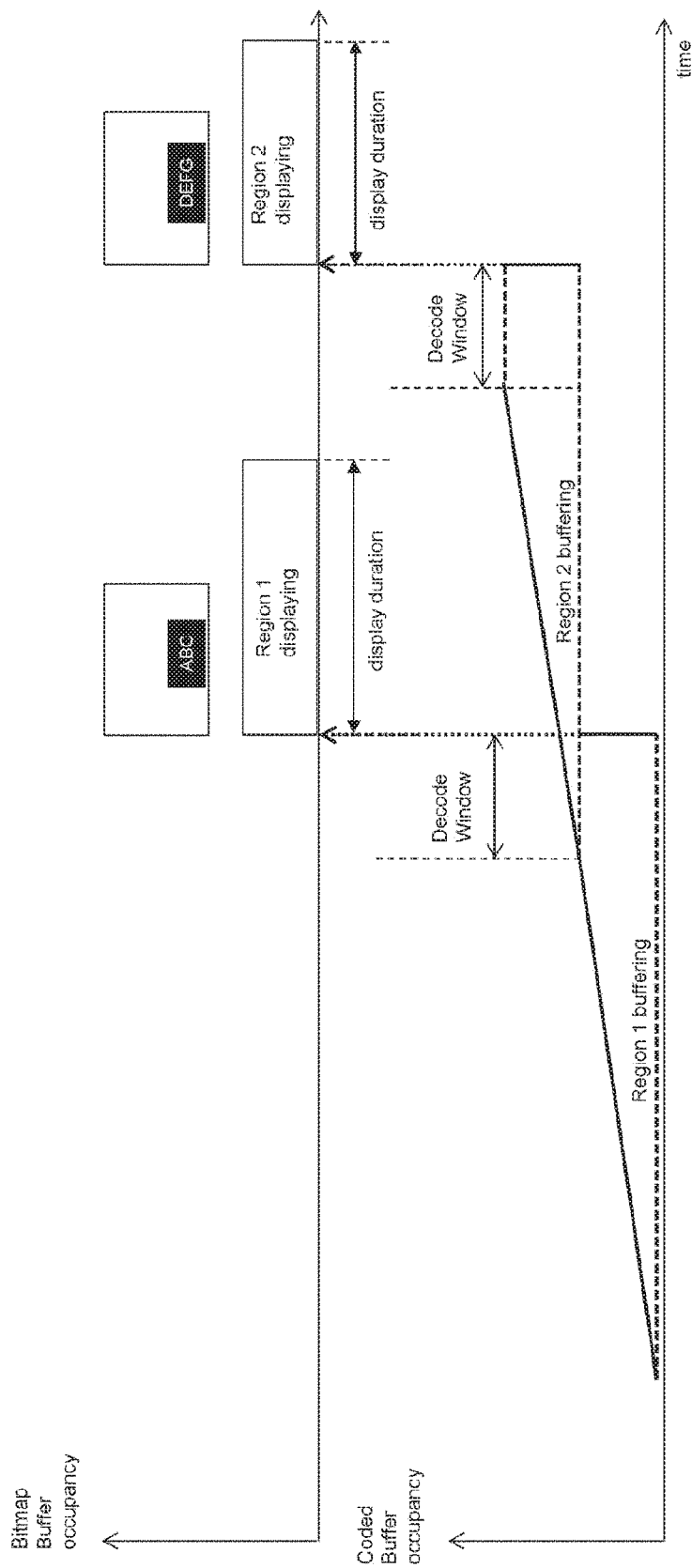
FIG. 15 is a diagram illustrating an example of basic operation of the decoder buffer model.

FIG. 15 illustrates an example of basic operation of the decoder buffer model 300A. The segment data of a region 1 is buffered in the coded buffer 301. Then, after all the segment data of the region 1 is stored in the coded buffer 301 and a certain window period (Decode Window) elapses, the segment data is decoded by the subtitle segment decoder 302, the font is expanded by the font expansion unit 303, and the bitmap data of the region 1 is obtained.

With the decoding processing, the segment data of the region 1 instantly disappears from the coded buffer 301. The bitmap data obtained by the font expansion unit 303 is held by the bitmap buffer 304. The display of the region 1 is started and lasts for the display duration. In the illustrated example, the region 1 having the characters "ABC" is displayed on the screen immediately after the decoding for the display duration. When the display duration elapses, the bitmap data of the region 1 instantly disappears from the bitmap buffer 304.

After all the segment data of the region 1 is stored in the coded buffer 301, the segment data of a region 2 is buffered in the coded buffer 301. The processing similar to the above region 1 is sequentially performed for the region 2.

In other words, after all the segment data of the region 2 is stored in the coded buffer 301 and a certain window period (Decode Window) elapses, the segment data is decoded by the subtitle segment decoder 302, the font is expanded by the font expansion unit 303, and the display of the region 2 is started and lasts for the display duration. In the illustrated example, the region 2 having the characters "DEFG" is displayed on the screen immediately after the decoding for the display duration.

Thereafter, similar processing is continued.

Figure 16:
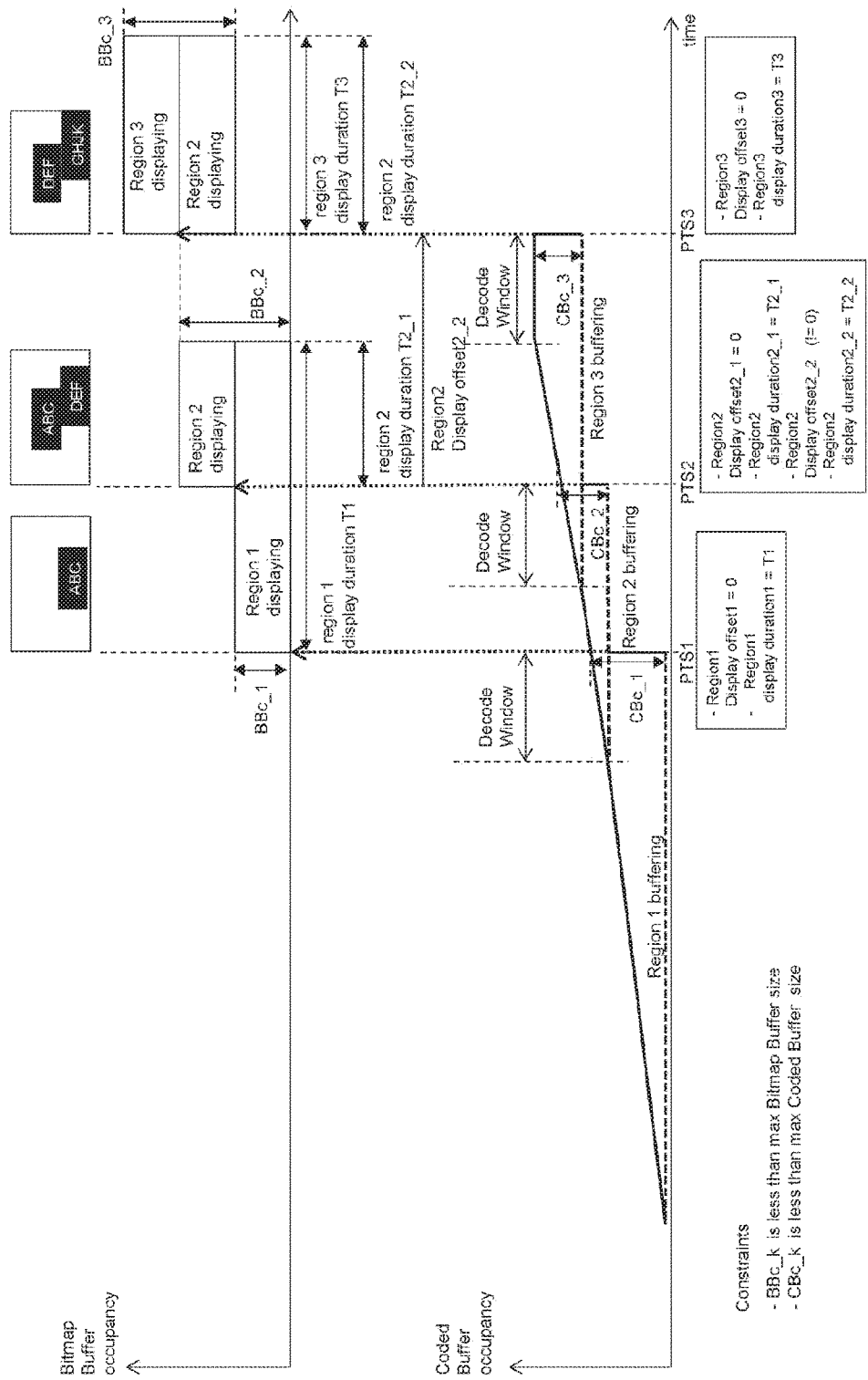
FIG. 16 is a diagram illustrating an example of more practical operation of the decoder buffer model.

FIG. 16 illustrates an example of more practical operation of the decoder buffer model 300A. This example shows that the region 1 is only displayed at a certain timing, the region 2 is simultaneously displayed from the next timing, the region 1 is not displayed at a certain timing, and then, the display of a region 3 is added to the display of the region 2.

The segment data of a region 1 is buffered in the coded buffer 301. Then, after all the segment data of the region 1 is stored in the coded buffer 301 and a certain window period (Decode Window) elapses, the segment data is decoded by the subtitle segment decoder 302, the font is expanded by the font expansion unit 303, and the bitmap data of the region 1 is obtained at the timing of the PTS1. The shortest window period is 0. This means that all the segment data necessary for the decoding needs to be buffered in the coded buffer 301 by the decode timing.

With the decoding processing, the segment data of the region 1 instantly disappears from the coded buffer 301. The bitmap data of the region 1 obtained by the font expansion unit 303 is held by the bitmap buffer 304. The data storage amount of the coded buffer 301 at the timing of the PTS1 is CBc_1, and the data storage amount of the bitmap buffer 304 at the timing of the PTS1 is BBc_1.

Here, "display offset" is defined. This indicates the delay from the PTS timing to the display start timing. In the illustrated example, the display of the region 1 is started at the timing of the PTS1, which means "display offset1=0".

Furthermore, "display duration" is defined here. This indicates the display duration. The illustrated example shows "display duration1=T1". In the illustrated example, the region 1 having the characters "ABC" is displayed on the screen for the duration T1. When the display duration elapses, the bitmap data of the region 1 instantly disappears from the bitmap buffer 304. In other words, while the region 1 is being displayed, the bitmap data of the region 1 is maintained in the bitmap buffer 304.

Here, the buffer model is restricted so that the data storage amount CBc_k of the coded buffer 301 is smaller than its buffer size at all times and the data storage amount BBc_k of the bitmap buffer 304 is smaller than its buffer size at all times.

After all the segment data of the region 1 is stored in the coded buffer 301, the segment data of the region 2 is buffered in the coded buffer 301. Then, after all the segment data of the region 2 is stored in the coded buffer 301 and a certain window period (Decode Window) elapses, the segment data is decoded by the subtitle segment decoder 302, the font is expanded by the font expansion unit 303, and the bitmap data of the region 2 is obtained at the timing of the PTS2.

With the decoding processing, the segment data of the region 2 instantly disappears from the coded buffer 301. The bitmap data of the region 2 obtained by the font expansion unit 303 is held by the bitmap buffer 304. The data storage amount of the coded buffer 301 at the timing of the PTS2 is CBc_2, and the data storage amount of the bitmap buffer 304 at the timing of the PTS2 is BBc_2.

Here, the display of the region 2 is started at the timing of the PTS2, which means "display offset2_1=0". Then, the region 2 is displayed for the duration T2_1, which means "display duration2_1=T2_1". In the illustrated example, the region 2 having the characters "DEF" is displayed on the screen for the duration T2_1. In this case, the display of the region 2 is added to the display of the region 1 from the timing of the PTS2. Note that, the display position of the region 1 is shifted upward at the timing of the PTS2.

Furthermore, with regard to the region 2, the bitmap data of the region 2 does not disappear from the bitmap buffer 304 at the end timing of the duration T2_1, but is held. The display of the region 2 is resumed at the timing of the PTS3 after a predetermined duration from the timing of the PTS2, which means "display offset2_1=!0". Then, the region 2 is displayed for the duration T2_2, which means "display duration2_2=T2_2".

Furthermore, after all the segment data of the region 2 is stored in the coded buffer 301, the segment data of the region 3 is buffered in the coded buffer 301. Then, after all the segment data of the region 3 is stored in the coded buffer 301 and a certain window period (Decode Window) elapses, the segment data is decoded by the subtitle segment decoder 302, the font is expanded by the font expansion unit 303, and the bitmap data of the region 3 is obtained at the timing of the PTS3.

With the decoding processing, the segment data of the region 3 instantly disappears from the coded buffer 301. The bitmap data obtained by the font expansion unit 303 is held by the bitmap buffer 304. The data storage amount of the coded buffer 301 at the timing of the PTS3 is CBc_3, and the data storage amount of the bitmap buffer 304 at the timing of the PTS3 is BBc_3.

Here, the display of the region 3 is started at the timing of the PTS3, which means "display offset3=0". Then, the region 3 is displayed for the duration T3, which means "display duration3=T3". In the illustrated example, the region 3 having the characters "GHJK" is displayed on the screen for the duration T3. In this case, the regions 2 and 3 are displayed from the timing of the PTS3. Note that, the display position of the region 2 is shifted upward at the timing of the PTS3.

Note that, the example illustrates that there is the time difference between the end timing of the duration T2_1 and the timing of the PTS3, but it may be the same timing.

Figure 17:
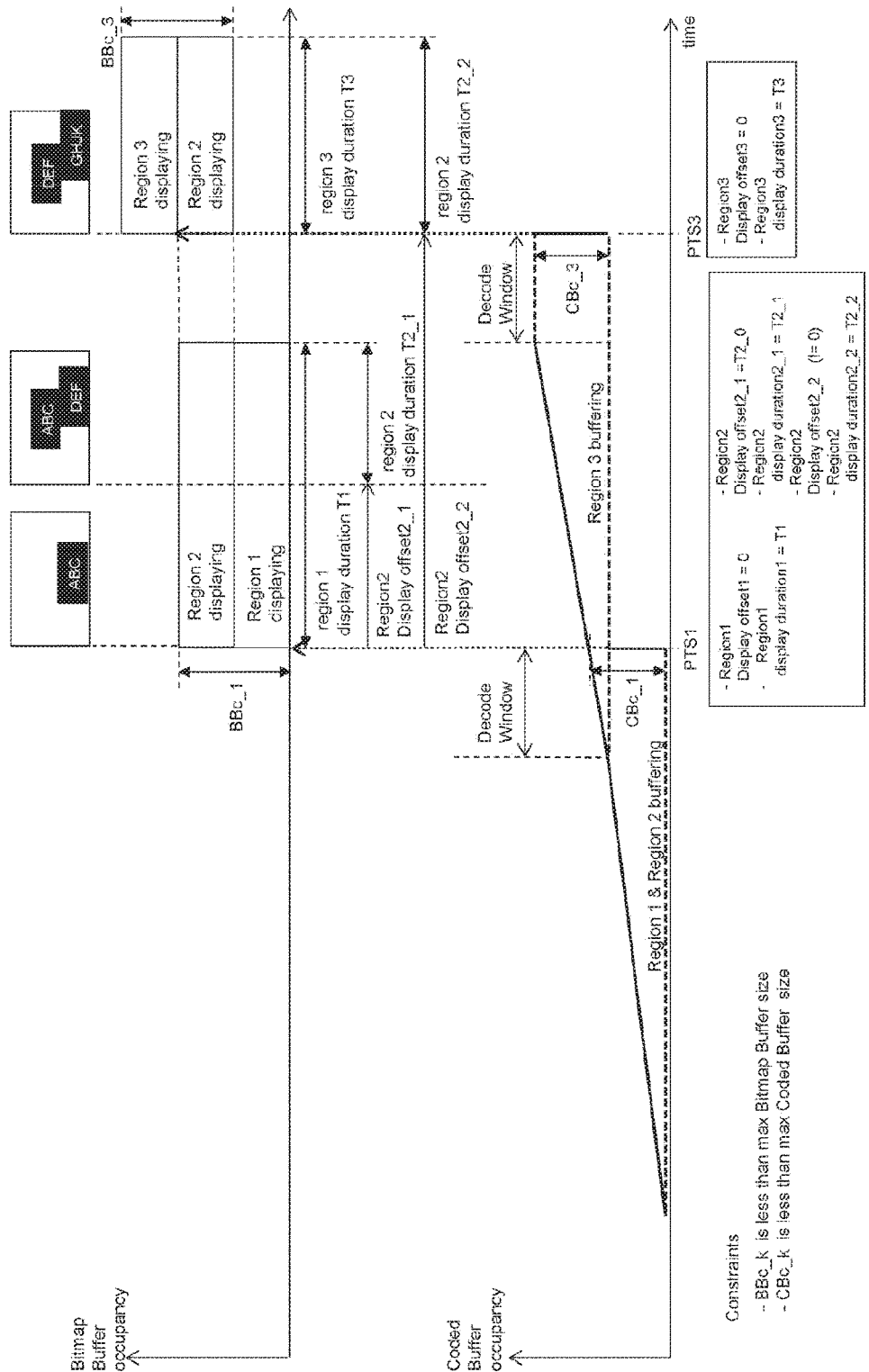
FIG. 17 is a diagram illustrating another example of more practical operation of the decoder buffer model.

FIG. 17 illustrates another example of more practical operation of the decoder buffer model 300A. This example shows, as similarly to the example illustrated in FIG. 16, that the region 1 is only displayed at a certain timing, the region 2 is simultaneously displayed from the next timing, the region 1 is not displayed at a certain timing, and then, the display of the region 3 is added to the display of the region 2. However, unlike the example illustrated in FIG. 16, the regions 1 and 2 are decoded simultaneously.

The segment data of the region 1 and the segment data of the region 2 are buffered in the coded buffer 301. Then, after all the segment data of the regions 1 and 2 is stored in the coded buffer 301 and a certain window period (Decode Window) elapses, the segment data is decoded by the subtitle segment decoder 302, the font is expanded by the font expansion unit 303, and the bitmap data of the regions 1 and 2 is obtained at the timing of the PTS1.

With the decoding processing, the segment data of the regions 1 and 2 instantly disappears from the coded buffer 301. The bitmap data of the regions 1 and 2 obtained by the font expansion unit 303 is held by the bitmap buffer 304. The data storage amount of the coded buffer 301 at the timing of the PTS1 is CBc_1, and the data storage amount of the bitmap buffer 304 at the timing of the PTS1 is BBc_1.

Here, "display offset" is defined. This indicates the delay from the PTS timing to the display start timing. In the illustrated example, the display of the region 1 is started at the timing of the PTS1, which means "display offset1=0".

Furthermore, "display duration" is defined here. This indicates the display duration. The illustrated example shows "display duration1=T1". In the illustrated example, the region 1 having the characters "ABC" is displayed on the screen for the duration T1. When the display duration elapses, the bitmap data of the region 1 instantly disappears from the bitmap buffer 304. In other words, while the region 1 is being displayed, the bitmap data of the region 1 is maintained in the bitmap buffer 304.

Here, the buffer model is restricted so that the data storage amount CBc_k of the coded buffer 301 is smaller than its buffer size at all times and the data storage amount BBc_k of the bitmap buffer 304 is smaller than its buffer size at all times.

Furthermore, the display of the region 2 is started at the timing after the duration T2_0 from the timing of the PTS1, which means "display offset2_1=T2_0". Then, the region 2 is displayed for the duration T2_1, which means "display duration2_1=T2_1". In the illustrated example, the region 2 having the characters "DEF" is displayed on the screen for the duration T2_1. In this case, the display of the region 2 is added to the display of the region 1. Note that, the display position of the region 1 is shifted upward.

Furthermore, with regard to the region 2, the bitmap data of the region 2 does not disappear from the bitmap buffer 304 at the end timing of the duration T2_1, but is held. The display of the region 2 is resumed at the timing of the PTS3 after a predetermined duration from the timing of the PTS1, which means "display offset2_1=!0". Then, the region 2 is displayed for the duration T2_2, which means "display duration2_2=T2_2".

Furthermore, after all the segment data of the regions 1 and 2 is stored in the coded buffer 301, the segment data of the region 3 is buffered in the coded buffer 301. Then, after all the segment data of the region 3 is stored in the coded buffer 301 and a certain window period (Decode Window) elapses, the segment data is decoded by the subtitle segment decoder 302, the font is expanded by the font expansion unit 303, and the bitmap data of the region 3 is obtained at the timing of the PTS3.

With the decoding processing, the segment data of the region 3 instantly disappears from the coded buffer 301. The bitmap data obtained by the font expansion unit 303 is held by the bitmap buffer 304. The data storage amount of the coded buffer 301 at the timing of the PTS3 is CBc_3, and the data storage amount of the bitmap buffer 304 at the timing of the PTS3 is BBc_3.

Here, the display of the region 3 is started at the timing of the PTS3, which means "display offset3=0". Then, the region 3 is displayed for the duration T3, which means "display duration3=T3". In the illustrated example, the region 3 having the characters "GHJK" is displayed on the screen for the duration T3. In this case, the regions 2 and 2 are displayed from the timing of the PTS3. Note that, the display position of the region 2 is shifted upward at the timing of the PTS3.

Note that, the example illustrates that there is the time difference between the end timing of the duration T2_1 and the timing of the PTS3, but it may be the same timing.

Figure 18:
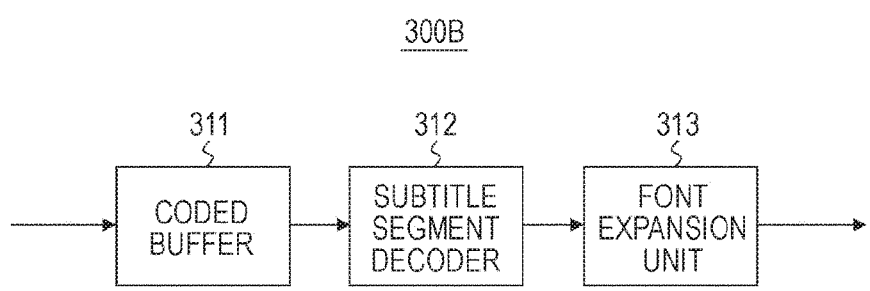
FIG. 18 is a diagram illustrating another configuration example of the decoder buffer model.

FIG. 18 illustrates a configuration example of a decoder buffer model 300B. The decoder buffer model 300B includes a coded buffer 311, a subtitle segment decoder 312, and a font expansion unit 313. The coded buffer 311 temporarily holds received segment data.

The subtitle segment decoder 312 continuously performs decoding processing for each frame to the segment data of each region held by the coded buffer 311 and obtains the text data and the control code of each region during the display duration of each region. The font expansion unit 313 expands, for each frame, the font on the basis of the text data and the control code obtained by the subtitle segment decoder 312 and obtains the bitmap data of each region during the display duration of each region. The bitmap data of each region obtained by the font expansion unit 313 is superimposed on the image data.

Figure 19:
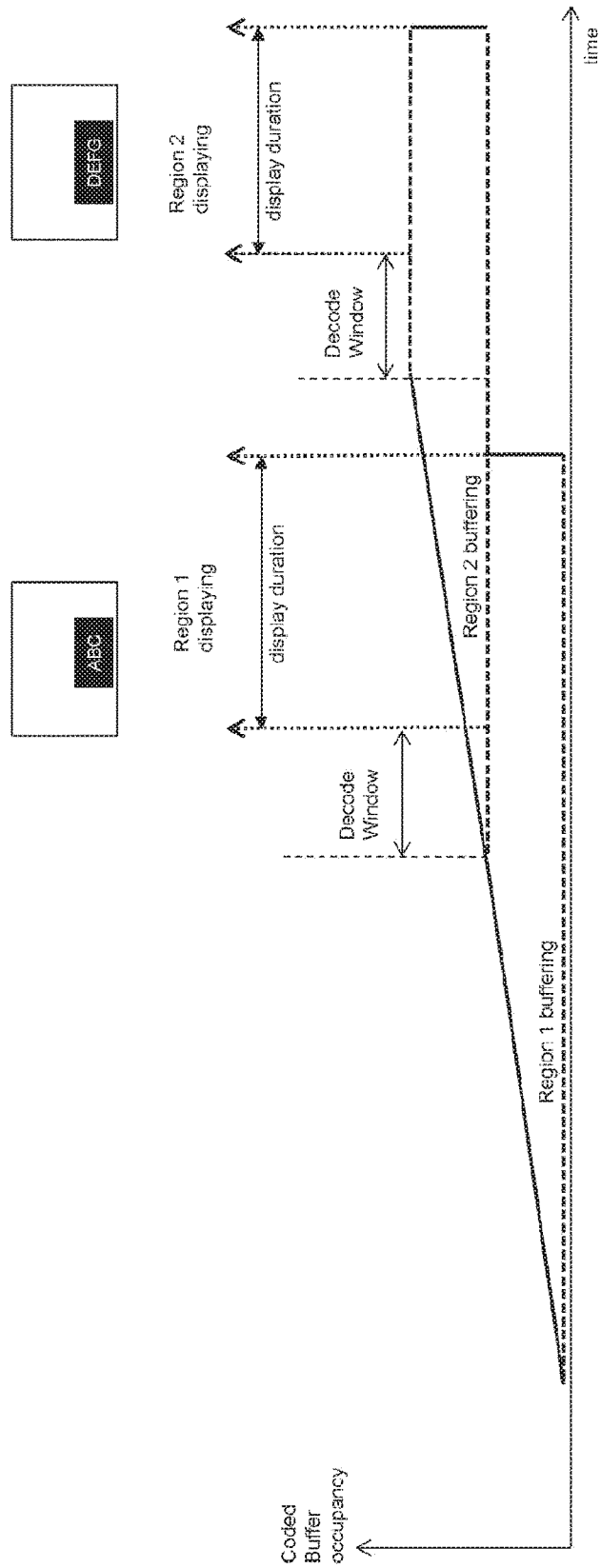
FIG. 19 is a diagram illustrating an example of basic operation of the decoder buffer model.

FIG. 19 illustrates an example of basic operation of the decoder buffer model 300B. The segment data of the region 1 is buffered in the coded buffer 311. Then, after all the segment data of the region 1 is stored in the coded buffer 311 and a certain window period (Decode Window) elapses, the segment data is decoded by the subtitle segment decoder 312, the font is expanded by the font expansion unit 313, and the bitmap data of the region 1 is obtained. Thus, the display of the region 1 is started and lasts for the display duration. In the illustrated example, the region 1 having the characters "ABC" is displayed on the screen for the display duration.

In the subtitle segment decoder 312 and the font expansion unit 313, the processing is repeated for each frame during the display duration. When the display duration of the region 1 elapses, the processing of the subtitle segment decoder 312 and the font expansion unit 313 corresponding to the segment data of the region 1 is stopped, and the segment data of the region 1 instantly disappears from the coded buffer 311 at the timing.

After all the segment data of the region 1 is stored in the coded buffer 311, the segment data of a region 2 is buffered in the coded buffer 311. The processing similar to the above region 1 is sequentially performed for the region 2.

In other words, after all the segment data of the region 2 is stored in the coded buffer 311 and a certain window period (Decode Window) elapses, the segment data is decoded by the subtitle segment decoder 312, the font is expanded by the font expansion unit 313, and the bitmap data of the region 2 is obtained. Thus, the display of the region 2 is started and lasts for the display duration. In the illustrated example, the region 2 having the characters "DEFG" is displayed on the screen for the display duration.

Thereafter, similar processing is continued.

Figure 20:
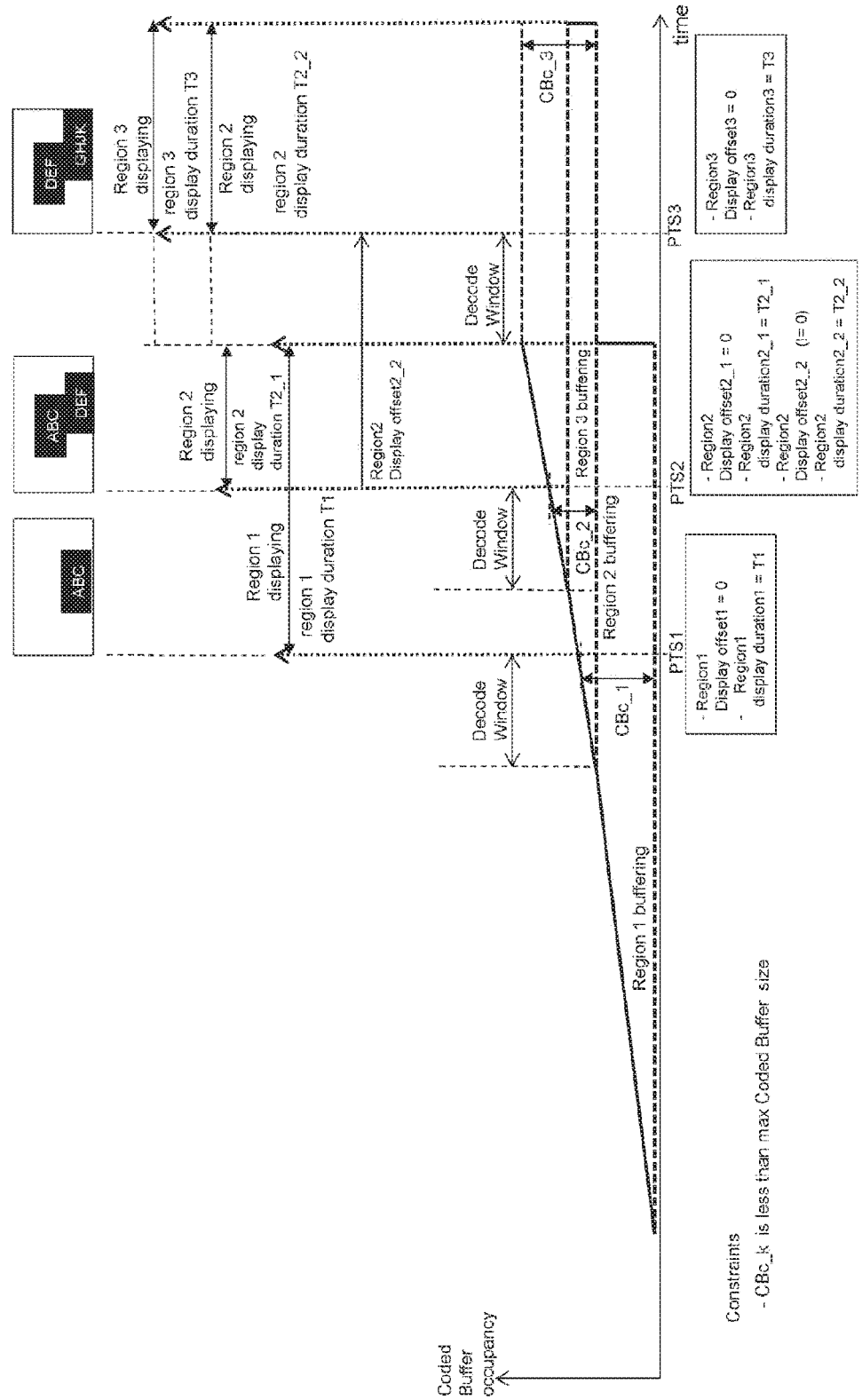
FIG. 20 is a diagram illustrating an example of more practical operation of the decoder buffer model.

FIG. 20 illustrates an example of more practical operation of the decoder buffer model 300B. This example shows that the region 1 is only displayed at a certain timing, the region 2 is simultaneously displayed from the next timing, the region 1 is not displayed at a certain timing, and then, the display of a region 3 is added to the display of the region 2.

The segment data of the region 1 is buffered in the coded buffer 311. Then, after all the segment data of the region 1 is stored in the coded buffer 311 and a certain window period (Decode Window) elapses, the timing of the PTS1 comes.

Here, "display offset" is defined. This indicates the delay from the PTS timing to the display start timing. In the illustrated example, the display of the region 1 is started at the timing of the PTS1, which means "display offset1=0". In this case, the segment data of the region 1 is decoded by the subtitle segment decoder 312, the font is expanded by the font expansion unit 313, and the bitmap data of the region 1 is obtained at the timing of the PTS1. Thus, the display of the region 1 is started. In the illustrated example, the display of the region 1 having the characters "ABC" is started.

Furthermore, "display duration" is defined here. This indicates the display duration. The example shows "display duration1=T1", and the display of the region 1 lasts for the duration T1. In the subtitle segment decoder 312 and the font expansion unit 313, the processing is repeated for each frame during the display duration of the region 1. When the display duration of the region 1 elapses, the processing of the subtitle segment decoder 312 and the font expansion unit 313 corresponding to the segment data of the region 1 is stopped, and the segment data of the region 1 instantly disappears from the coded buffer 311 at the timing.

The data storage amount of the coded buffer 311 at the timing of the PTS1 is CBc_1. Here, the buffer model is restricted so that the data storage amount CBc_k of the coded buffer 311 is smaller than its buffer size at all times.

After all the segment data of the region 1 is stored in the coded buffer 311, the segment data of the region 2 is buffered in the coded buffer 311. Then, after all the segment data of the region 2 is stored in the coded buffer 311 and a certain window period (Decode Window) elapses, the timing of the PTS2 comes. The data storage amount of the coded buffer 311 at the timing of the PTS2 is CBc_2.

The display of the region 2 is started at the timing of the PTS2, which means "display offset2-1=0". In this case, the segment data of the region 2 is decoded by the subtitle segment decoder 312, the font is expanded by the font expansion unit 313, and the bitmap data of the region 2 is obtained at the timing of the PTS2. Thus, the display of the region 2 is started. In the illustrated example, the display of the region 2 having the characters "DEF" is started. In this case, the display of the region 2 is added to the display of the region 1 from the timing of the PTS2. Note that, the display position of the region 1 is shifted upward at the timing of the PTS2.

Then, the region 2 is displayed for the duration T2_1, which means "display duration2_1=T2_1". In the illustrated example, the region 2 having the characters "DEF" is displayed on the screen for the duration T2_1. In the subtitle segment decoder 312 and the font expansion unit 313, the processing is repeated for each frame during the display duration of the region 2.

Furthermore, with regard to the region 2, the segment data of the region 2 does not disappear from the coded buffer 311 at the end timing of the duration T2_1, but is held. The display of the region 2 is resumed at the timing of the PTS3 after a predetermined duration from the timing of the PTS2, which means "display offset2_1=!0". Then, the region 2 is displayed for the duration T2_2, which means "display duration2_2=T2_2". When all the display duration of the region 2 elapses, the segment data of the region 2 instantly disappears from the coded buffer 311.

Furthermore, after all the segment data of the region 2 is stored in the coded buffer 311, the segment data of the region 3 is buffered in the coded buffer 311. Then, after all the segment data of the region 3 is stored in the coded buffer 311 and a certain window period (Decode Window) elapses, the timing of the PTS3 comes. The data storage amount of the coded buffer 311 at the timing of the PTS3 is CBc_3.

The display of the region 3 is started at the timing of the PTS3, which means "display offset3=0". In this case, the segment data of the region 3 is decoded by the subtitle segment decoder 312, the font is expanded by the font expansion unit 313, and the bitmap data of the region 3 is obtained at the timing of the PTS3. Thus, the display of the region 3 is started. In the illustrated example, the display of the region 3 having the characters "GHJK" is started. In this case, the display of the region 3 is added to the display of the region 2 from the timing of the PTS3. Note that, the display position of the region 2 is shifted upward at the timing of the PTS3.

Then, the region 3 is displayed for the duration T3, which means "display duration3=T3". In the illustrated example, the region 3 having the characters "GHJK" is displayed on the screen for the duration T3. In the subtitle segment decoder 312 and the font expansion unit 313, the processing is repeated for each frame during the display duration of the region 3.

Note that, the example illustrates that there is the time difference between the end timing of the duration T2_1 and the timing of the PTS3, but it may be the same timing.

Figure 21:
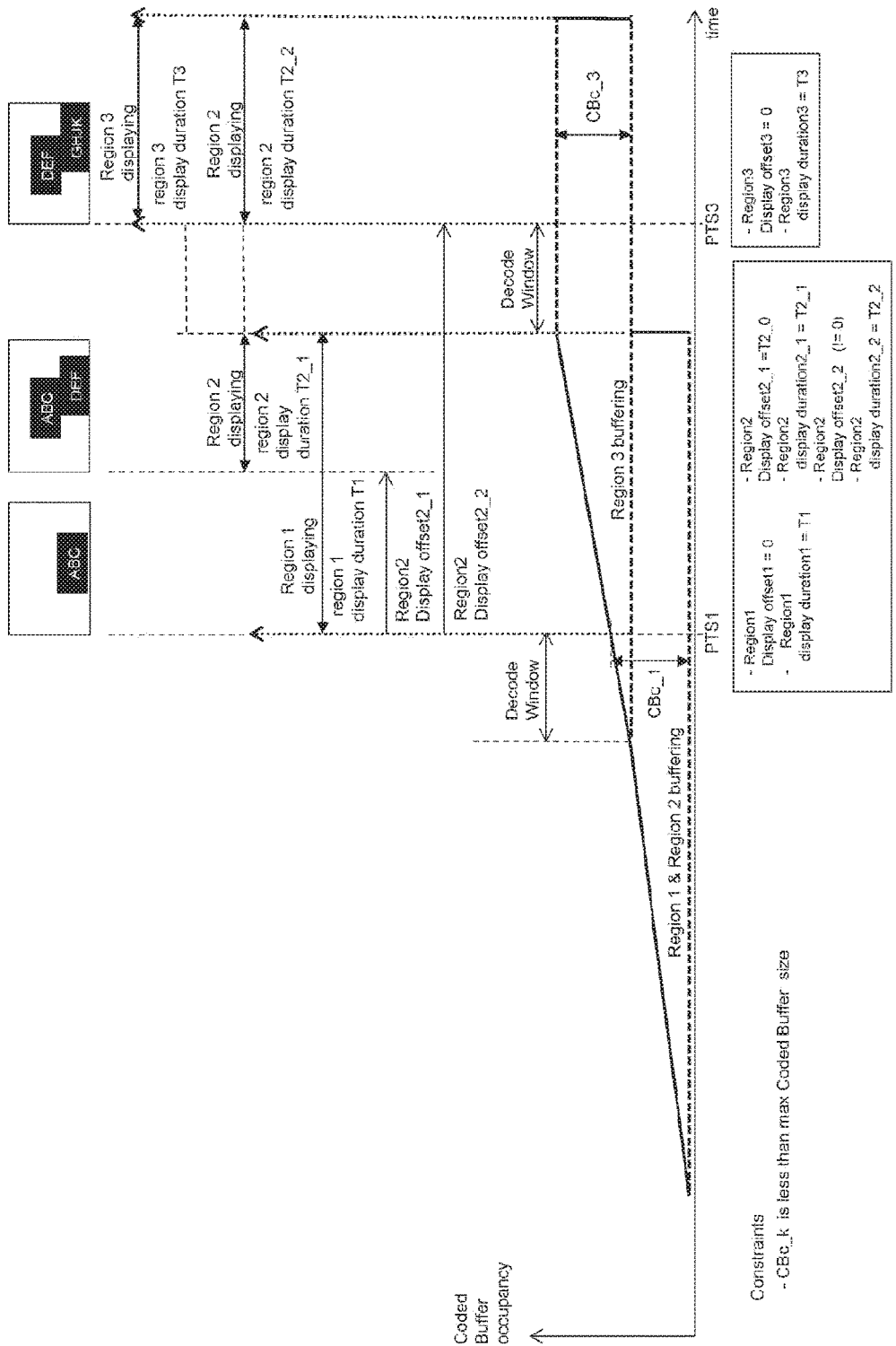
FIG. 21 is a diagram illustrating another example of more practical operation of the decoder buffer model.

FIG. 21 illustrates another example of more practical operation of the decoder buffer model 300B. This example shows, as similarly to the example illustrated in FIG. 20, that the region 1 is only displayed at a certain timing, the region 2 is simultaneously displayed from the next timing, the region 1 is not displayed at a certain timing, and then, the display of the region 3 is added to the display of the region 2. However, unlike the example illustrated in FIG. 20, after all the segment data of the regions 1 and 2 is stored in the coded buffer 311, the display of the region 1 is started.

The segment data of the region 1 and the segment data of the region 2 are buffered in the coded buffer 301. Then, after all the segment data of the regions 1 and 2 is stored in the coded buffer 301 and a certain window period (Decode Window) elapses, the timing of the PTS1 comes.

Here, "display offset" is defined. This indicates the delay from the PTS timing to the display start timing. In the illustrated example, the display of the region 1 is started at the timing of the PTS1, which means "display offset1=0". In this case, the segment data of the region 1 is decoded by the subtitle segment decoder 312, the font is expanded by the font expansion unit 313, and the bitmap data of the region 1 is obtained at the timing of the PTS1. Thus, the display of the region 1 is started. In the illustrated example, the display of the region 1 having the characters "ABC" is started.

Furthermore, "display duration" is defined here. This indicates the display duration. The example shows "display duration1=T1", and the display of the region 1 lasts for the duration T1. In the subtitle segment decoder 312 and the font expansion unit 313, the processing is repeated for each frame during the display duration of the region 1. When the display duration of the region 1 elapses, the processing of the subtitle segment decoder 312 and the font expansion unit 313 corresponding to the segment data of the region 1 is stopped, and the segment data of the region 1 instantly disappears from the coded buffer 311 at the timing.

The data storage amount of the coded buffer 311 at the timing of the PTS1 is CBc_1. Here, the buffer model is restricted so that the data storage amount CBc_k of the coded buffer 311 is smaller than its buffer size at all times.

Furthermore, the display of the region 2 is started at the timing after the duration T2_0 from the timing of the PTS1, which means "display offset2_1=T2_0". The segment data of the region 2 is decoded by the subtitle segment decoder 312, the font is expanded by the font expansion unit 313, and the bitmap data of the region 2 is obtained at the timing. Thus, the display of the region 2 is started. In the illustrated example, the display of the region 2 having the characters "DEF" is started. In this case, the display of the region 2 is added to the display of the region 1. Note that, the display position of the region 1 is shifted upward.

Then, the region 2 is displayed for the duration T2_1, which means "display duration2_1=T2_1". In the illustrated example, the region 2 having the characters "DEF" is displayed on the screen for the duration T2_1. In the subtitle segment decoder 312 and the font expansion unit 313, the processing is repeated for each frame during the display duration of the region 2.

Furthermore, with regard to the region 2, the segment data of the region 2 does not disappear from the coded buffer 311 at the end timing of the duration T2_1, but is held. The display of the region 2 is resumed at the timing of the PTS3 after a predetermined duration from the timing of the PTS2, which means "display offset2_1=!0". Then, the region 2 is displayed for the duration T2_2, which means "display duration2_2=T2_2". When all the display duration of the region 2 elapses, the segment data of the region 2 instantly disappears from the coded buffer 311.

Furthermore, after all the segment data of the region 2 is stored in the coded buffer 311, the segment data of the region 3 is buffered in the coded buffer 311. Then, after all the segment data of the region 3 is stored in the coded buffer 311 and a certain window period (Decode Window) elapses, the timing of the PTS3 comes. The data storage amount of the coded buffer 311 at the timing of the PTS3 is CBc_3.

The display of the region 3 is started at the timing of the PTS3, which means "display offset3=0". In this case, the segment data of the region 3 is decoded by the subtitle segment decoder 312, the font is expanded by the font expansion unit 313, and the bitmap data of the region 3 is obtained at the timing of the PTS3. Thus, the display of the region 3 is started. In the illustrated example, the display of the region 3 having the characters "GHJK" is started. In this case, the display of the region 3 is added to the display of the region 2 from the timing of the PTS3. Note that, the display position of the region 2 is shifted upward at the timing of the PTS3.

Then, the region 3 is displayed for the duration T3, which means "display duration3=T3". In the illustrated example, the region 3 having the characters "GHJK" is displayed on the screen for the duration T3. In the subtitle segment decoder 312 and the font expansion unit 313, the processing is repeated for each frame during the display duration of the region 3.

Note that, the example illustrates that there is the time difference between the end timing of the duration T2_1 and the timing of the PTS3, but it may be the same timing.

Returning back to FIG. 2, a TS formatter 116 multiplexes the video stream generated by the video encoder 112, the audio stream generated by the audio encoder 113, and the subtitle stream generated by the subtitle encoder 115 by transport-packetizing them, and obtains the transport stream TS as a multiplexed stream.

The operation of the stream generation unit 110 illustrated in FIG. 3 is briefly described. The image data DV is supplied to the video encoder 112. In the video encoder 112, coding is performed to the image data DV, and a video stream having the coded image data (PES stream) is generated. The video stream is supplied to the TS formatter 116. Furthermore, the audio data DA is supplied to the audio encoder 113. In the audio encoder 113, coding is performed to the audio data DA, and an audio stream having the coded audio data (PES stream) is generated. The audio stream is supplied to the TS formatter 116.

Furthermore, the text data (character code) DT as the subtitle information is supplied to the text format conversion unit 114. In the text format conversion unit 114, the text information on the subtitles in a predetermined format having the display timing information, here the TTML, is obtained. The TTML is supplied to the subtitle encoder 115.

In the subtitle encoder 115, the TTML is converted into various segments, and a subtitle stream constituted by the PES packet in which the segments are arranged in the payload is generated. The subtitle stream is supplied to the TS formatter 116.

The payload part of the PES packet contains the segments of the TCS, the THMS, the THSS, the THLS, and the TBS, or the segments of the TCS and the TWS. The display timing information on the subtitles (region) (having information on display start timing and display duration) is transmitted by the TCS segment, and the TTML information is transmitted by the other segments.

In the subtitle encoder 115, when the TTML is converted into the segments, "PTS" to be inserted in the PES header and "display offset" and "display duration" inserted in the TCS are set referring to the system time information (the PCR and the synchronization time of the video and the audio) on the basis of the description on the display start timing and the display end timing of each subtitle contained in the body of the TTML.

In the TS formatter 116, the video stream generated by the video encoder 112, the audio stream generated by the audio encoder 113, and the subtitle stream generated by the subtitle encoder 115 are multiplexed by transport-packetizing them, and the transport stream TS is obtained as a multiplexed stream.

Figure 22:
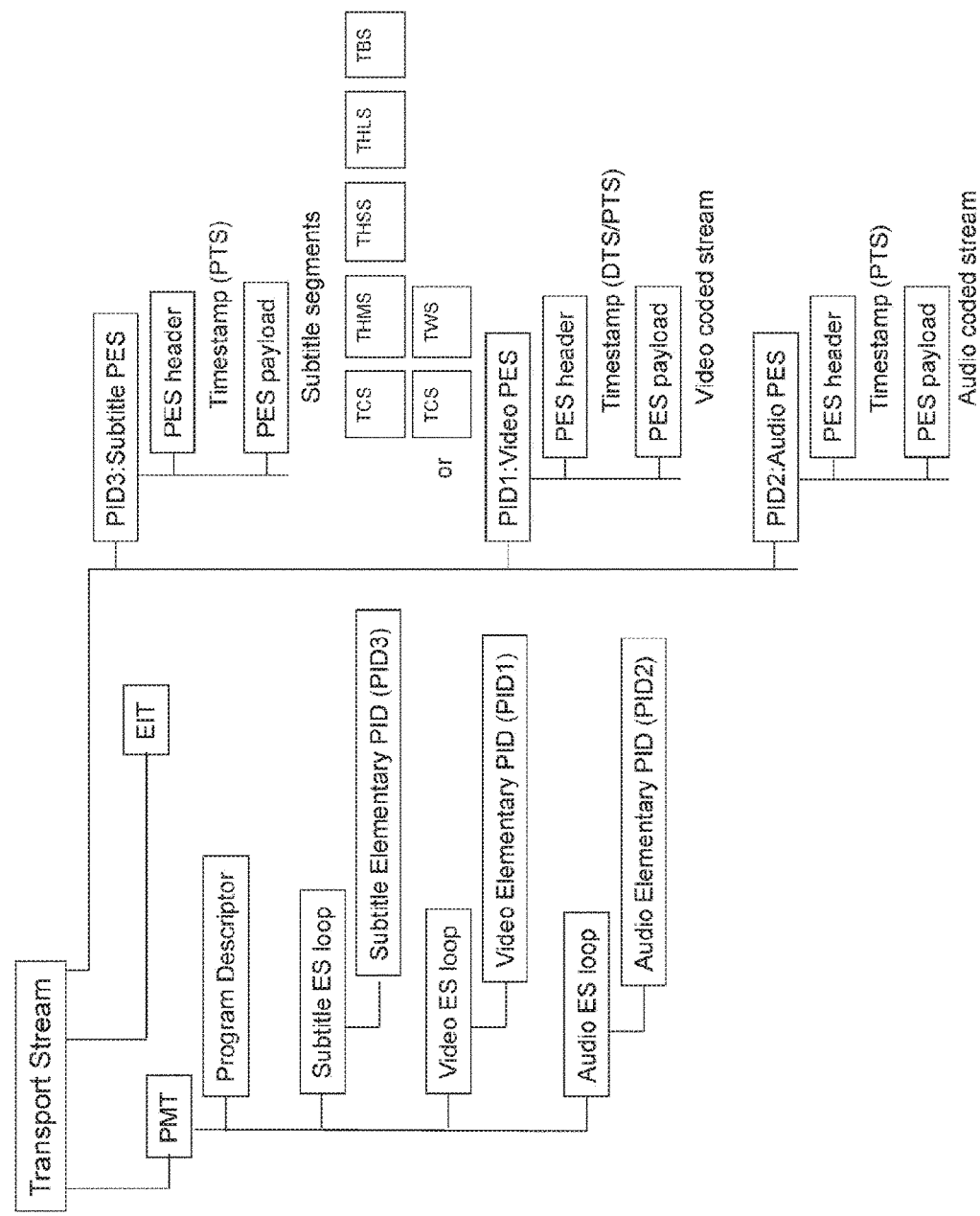
FIG. 22 is a diagram illustrating a configuration example of a transport stream TS.

FIG. 22 illustrates a configuration example of the transport stream TS. In this configuration example, there exists a PES packet "Video PES" of a video stream identified by PID1. Furthermore, in this configuration example, there exists a PES packet "Audio PES" of an audio stream identified by PID2. Furthermore, in this configuration example, there exists a PES packet "Subtitle PES" of a subtitle stream identified by PID3.

A PES packet is constituted by a PES header and a PES payload. In the PES packet of the video stream, a DTS/PTS time stamp is inserted in the PES header, and a coded video stream is inserted in the PES payload. Furthermore, in the PES packet of the audio stream, a PTS time stamp is inserted in the PES header, and a coded audio stream is inserted in the PES payload.

Furthermore, in the PES packet of the subtitle stream, a PTS time stamp is inserted in the PES header, and a plurality of subtitle segments is inserted in the PES payload. In other words, the subtitle segments are the segments of the TCS, the THMS, the THSS, the THLS, and the TBS, or the segments of the TCS and the TWS.

Furthermore, the transport stream TS contains a program map table (PMT) as program specific information (PSI). The PSI is the information in which it is described that each elementary stream contained in the transport stream belongs to which program. Furthermore, the transport stream TS contains an event information table (EIT) as serviced information (SI) for performing management in event units. The metadata in program units is described in the EIT.

There exists a program descriptor for describing information on all the programs in the PMT. Furthermore, there exists an elementary stream loop having information related to each elementary stream in the PMT. In this configuration example, there exist a video elementary stream loop (Video ES loop), an audio elementary stream loop (Audio ES loop), and a subtitle elementary stream loop (Subtitle ES loop). In each loop, the information on a packet identifier (PID) and the like are arranged, and a descriptor for describing the information on the elementary stream is also arranged although not illustrated.

[Configuration Example of Television Receiver]

Figure 23:
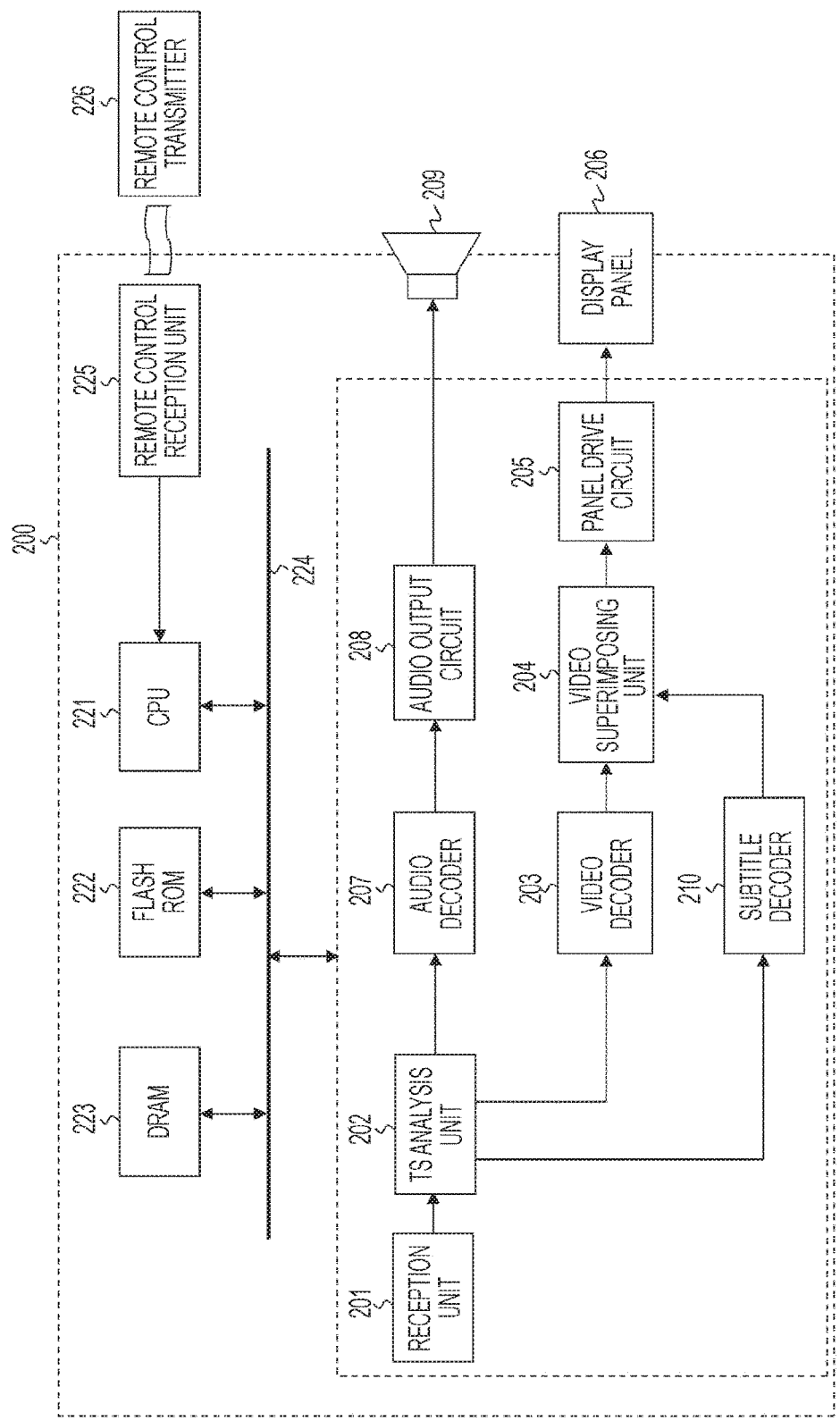
FIG. 23 is a diagram illustrating a configuration example of a television receiver.

FIG. 23 illustrates a configuration example of the television receiver 200. The television receiver 200 includes a reception unit 201, a TS analysis unit 202, a video decoder 203, a video superimposing unit 204, a panel drive circuit 205, and a display panel 206. Furthermore, the television receiver 200 includes an audio decoder 207, an audio output circuit 208, a speaker 209, and a subtitle decoder 210. Furthermore, the television receiver 200 includes a CPU 221, a flash ROM 222, a DRAM 223, an internal bus 224, a remote control reception unit 225, and a remote control transmitter 226.

The CPU 221 controls the operation of the components in the television receiver 200. The flash ROM 222 stores control software and data. The DRAM 223 forms the work area of the CPU 221. The CPU 221 expands software or data read from the flash ROM 222 in the DRAM 223, starts the software, and controls the components in the television receiver 200.

The remote control reception unit 225 receives a remote control signal (remote control code) transmitted from the remote control transmitter 226 and supplies the signal to the CPU 221. The CPU 221 controls the components in the television receiver 200 on the basis of the remote control code. The CPU 221, the flash ROM 222, and the DRAM 223 are connected with the internal bus 224.

The reception unit 201 receives the transport stream TS transmitted on a broadcast wave from the broadcast transmission system 100. As described above, the transport stream TS contains the video stream, the audio stream, and the subtitle stream. The TS analysis unit 202 extracts the packets of the video, audio, and subtitle streams from the transport stream TS.

The audio decoder 207 performs decoding processing to the audio stream extracted by the TS analysis unit 202, and obtains audio data. The audio output circuit 208 performs necessary processing, such as D/A conversion and amplification, to the audio data, and supplies it to the speaker 209. The video decoder 203 performs decoding processing to the video stream extracted by the TS analysis unit 202, and obtains image data.

Figure 24:
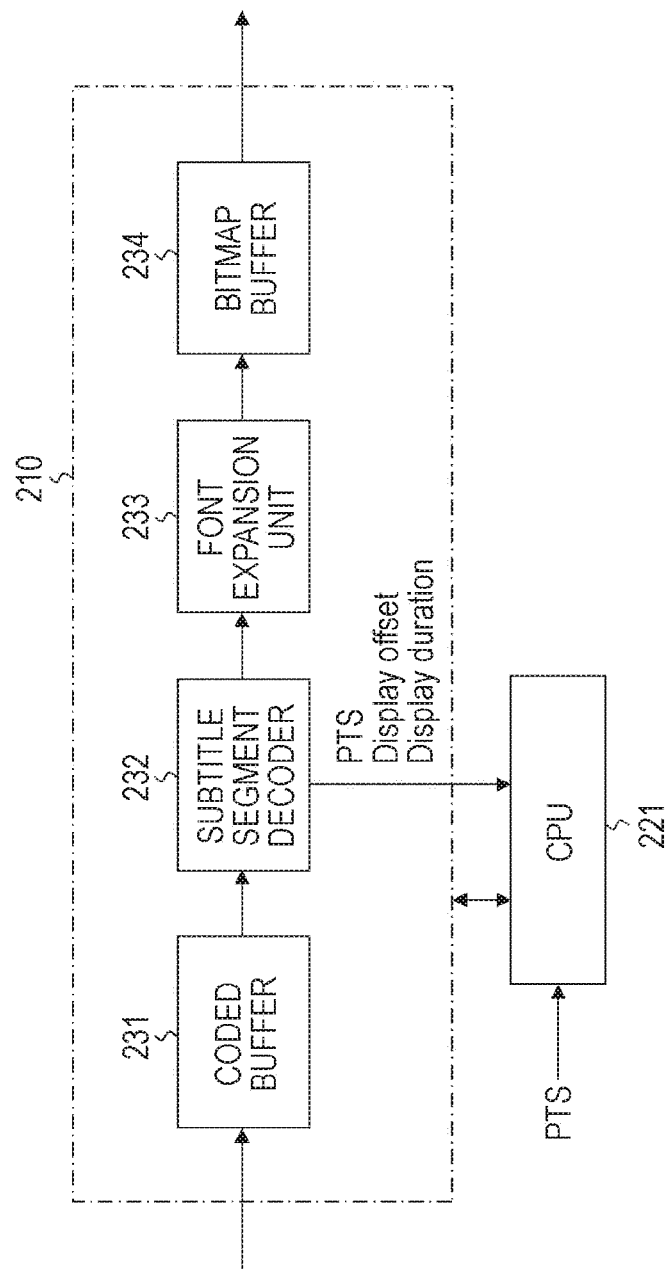
FIG. 24 is a diagram illustrating a configuration example of a subtitle decoder.
Figure 25:
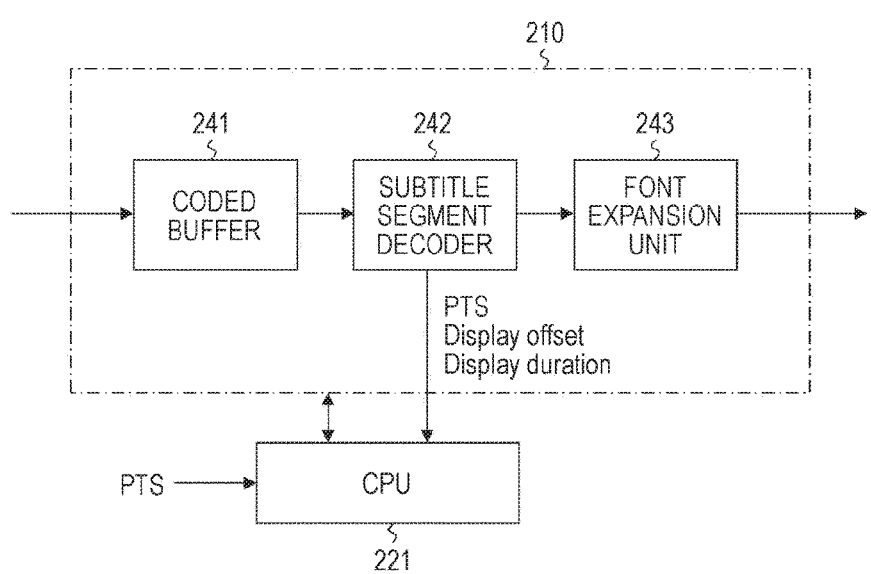
FIG. 25 is a diagram illustrating another configuration example of the subtitle decoder.

The subtitle decoder 210 processes the segment data of each region extracted by the TS analysis unit 202, and outputs the bitmap data of each region to be superimposed on the image data. FIGS. 24 and 25 illustrate configuration examples of the subtitle decoder 210.

The subtitle decoder 210 illustrated in FIG. 24 has a configuration corresponding to the decoder buffer model 300A in FIG. 14. In other words, the subtitle decoder 210 includes a coded buffer 231, a subtitle segment decoder 232, a font expansion unit 233, and a bitmap buffer 234.

The coded buffer 231 temporarily holds received segment data. The subtitle segment decoder 232 performs decoding processing to the segment data of each region held by the coded buffer 231 at predetermined timing, and obtains the text data and the control code of each region. The font expansion unit 233 expands the font on the basis of the text data and the control code of each region obtained by the subtitle segment decoder 232, and obtains the bitmap data of each region.

The bitmap buffer 234 temporarily holds the bitmap data of each region obtained by the font expansion unit 233. The bitmap data of each region held by the bitmap buffer 234 is read from the display start timing, and superimposed on the image data, and which lasts for the display duration.

Here, the subtitle segment decoder 232 extracts a PTS from the PES header of the PES packet. Furthermore, the subtitle segment decoder 232 extracts the information on "display offset" and "display duration" of each region from the TCS segment (see FIG. 12). The information is transmitted to the CPU 221. The CPU 221 controls, on the basis of the information, the processing timing of the subtitle segment decoder 232 and the font expansion unit 233, the timing to read the bitmap data of each region from the bitmap buffer 234, and the like so that the operation similar to that of the decoder buffer model 300A explained with FIG. 14 is performed (see FIGS. 15 to 17).

Furthermore, the subtitle decoder 210 illustrated in FIG. 25 has a configuration corresponding to the decoder buffer model 300B in FIG. 18. In other words, the subtitle decoder 210 includes a coded buffer 241, a subtitle segment decoder 242, and a font expansion unit 243.

The coded buffer 241 temporarily holds received segment data. The subtitle segment decoder 242 continuously performs decoding processing for each frame to the segment data of each region held by the coded buffer 241 and obtains the text data and the control code of each region during the display duration of each region. The font expansion unit 243 expands, for each frame, the font on the basis of the text data and the control code obtained by the subtitle segment decoder 242 and obtains the bitmap data of each region during the display duration of each region. The bitmap data of each region obtained by the font expansion unit 243 is superimposed on the image data.

Here, the subtitle segment decoder 242 extracts a PTS from the PES header of the PES packet. Furthermore, the subtitle segment decoder 242 extracts the information on "display offset" and "display duration" of each region from the TCS segment (see FIG. 12). The information is transmitted to the CPU 221. The CPU 221 controls, on the basis of the information, the processing timing of the subtitle segment decoder 232 and the font expansion unit 233 and the like so that the operation similar to that of the decoder buffer model 300B explained with FIG. 18 is performed (see FIGS. 19 to 21).

Returning back to FIG. 23, the video superimposing unit 204 superimposes the bitmap data of each region obtained by the subtitle decoder 210 on the image data obtained by the video decoder 203. The panel drive circuit 205 drives the display panel 206 on the basis of the image data for display obtained by the video superimposing unit 204. The display panel 206 is constituted by, for example, a liquid crystal display (LCD), an organic electroluminescence display, or the like.

The operation of the television receiver 200 illustrated in FIG. 23 is briefly described. In the reception unit 201, the transport stream TS transmitted on a broadcast wave from the broadcast transmission system 100 is received. The transport stream TS contains the video stream, the audio stream, and the subtitle stream.

The transport stream TS is supplied to the TS analysis unit 202. In the TS analysis unit 202, the packets of the video, audio, and subtitle streams are extracted from the transport stream TS. The video stream (PES stream) extracted by the TS analysis unit 202 is supplied to the video decoder 203. In the video decoder 203, decoding processing is performed to the video stream and image data is obtained. The image data is supplied to the video superimposing unit 204.

Furthermore, the subtitle stream (PES stream) extracted by the TS analysis unit 202 is supplied to the subtitle decoder 210. In the subtitle decoder 210, the segment data of each region is processed, and the bitmap data of each region to be superimposed on the image data is output. In this case, in the subtitle decoder 210, the output timing of the bitmap data of each region is controlled on the basis of the information on "display offset" and "display duration" extracted from the PTS and the TCS segments extracted from the PES header.

The bitmap data of each region output from the subtitle decoder 210 is supplied to the video superimposing unit 204. In the video superimposing unit 204, the bitmap data of each region output from the subtitle decoder 210 is superimposed on the image data obtained by the video decoder 203. The image data for display obtained by the video superimposing unit 204 is supplied to the panel drive circuit 205. In the panel drive circuit 205, the display panel 206 is driven on the basis of the video data of display. Thus, the image in which the regions are superimposed is displayed on the display panel 206.

Furthermore, the audio stream (PES stream) extracted by the TS analysis unit 202 is supplied to the audio decoder 207. In the audio decoder 207, decoding processing is performed to the audio stream, and audio data is obtained. The audio data is supplied to the audio output circuit 208. In the audio output circuit 208, necessary processing, such as D/A conversion and amplification, is performed to the audio data. Then, the processed audio data is supplied to the speaker 209. Thus, the audio corresponding to the display image on the display panel 206 is output from the speaker 209.

As described above, in the transceiver system 10 illustrated in FIG. 1, the subtitle stream having the text information and the display timing information on the subtitles is transmitted together with the video stream. Thus, it is possible to excellently perform the display timing control of the subtitles on the reception side.

Furthermore, in the transceiver system 10 illustrated in FIG. 1, the subtitle stream contains the segment having the TTML information having the text information and the display timing information on the subtitles, and the TCS segment having the display timing information (information on display start timing and display duration) corresponding to the display timing information of the TTML. Thus, it is possible to easily obtain the display timing information from the TCS segment, and to reduce the processing load on the reception side.

Furthermore, in the transceiver system 10 illustrated in FIG. 1, when the TTML is converted into the segments on the transmission side, "PTS", "display offset", and "display duration" of each subtitle are set referring to the system time information (the PCR and the synchronization time of the video and the audio) on the basis of the description on the display start timing and the display end timing of each subtitle contained in the body of the TTML. At this time, "PTS", "display offset", and "display duration" are set while it is verified that the operation of the reception side is correctly performed using the decoder buffer model (see FIGS. 14 and 18), and the display timing control of the subtitles is excellently performed on the reception side.

2. Modified Example

Note that, it has been exemplified that the TTML is used as the text information on the subtitles in a predetermined format having the display timing information in the above embodiment. However, the present technology is not limited to this, and other timed text information having information equivalent to the TTML may be used. For example, a derivative format of the TTML may be used.

Furthermore, the transceiver system 10 constituted by the broadcast transmission system 100 and the television receiver 200 has been described in the above embodiment, but the transceiver system to which the present technology can be applied is not limited to this. For example, the part of the television receiver 200 may be a set top box and a monitor connected by a digital interface, such as High-Definition Multimedia Interface (HDMI). Note that, "HDMI" is a registered trademark.

Furthermore, the present technology can be following configurations:

(1) A transmission apparatus including:
a video encoder which generates a video stream having coded image data;
a subtitle encoder which generates a subtitle stream having text information and display timing information on subtitles; and
a transmission unit which transmits a transport stream containing the video stream and the subtitle stream.

(2) The transmission apparatus according (1), in which the subtitle encoder generates the subtitle stream on the basis of the text information on the subtitles in a predetermined format having the display timing information.

(3) The transmission apparatus according to (2), in which the text information on the subtitles in the predetermined format is in a TTML or in a derivative format of the TTML.

(4) The transmission apparatus according to any one of (1) to (3), in which the display timing information on the subtitles has information on, at least, display start timing and display duration.

(5) The transmission apparatus according to (4), in which
the subtitle stream is constituted by a PES packet constituted by a PES header and a PES payload,
the text information and the display timing information on the subtitles are arranged in the PES payload, and
the display start timing is indicated by a display offset from a PTS inserted in the PES header.

(6) A transmission method including:
a video encoding step of generating a video stream having coded image data;
a subtitle encoding step of generating a subtitle stream having text information and display timing information on subtitles; and
a transmission step of transmitting, by a transmission unit, a transport stream containing the video stream and the subtitle stream.

(7) A reception apparatus including:
a reception unit which receives a transport stream containing a video stream having coded image data and a subtitle stream having text information and display timing information on subtitles;
a video decoder which performs decoding processing to the video stream and obtains image data;
a subtitle decoder which performs decoding processing to the subtitle stream and obtains bitmap data of the subtitles and the display timing information on the subtitles; and
a display control unit which controls timing to superimpose the bitmap data of the subtitles on the image data on the basis of the display timing information.

(8) The reception apparatus according to (7), in which the display timing information on the subtitles has information on, at least, display start timing and display duration.

(9) The reception apparatus according to (8), in which the subtitle stream is constituted by a PES packet constituted by a PES header and a PES payload,
the text information and the display timing information on the subtitles are arranged in the PES payload, and
the display start timing is indicated by a display offset from a PTS inserted in the PES header.

(10) A reception method including:
a reception step of receiving, by a reception unit, a transport stream containing a video stream having coded image data and a subtitle stream having text information and display timing information on subtitles;
a video decoding step of performing decoding processing to the video stream and obtaining image data;
a subtitle decoding step of performing decoding processing to the subtitle stream and obtaining bitmap data of the subtitles and the display timing information on the subtitles; and
a display control step of controlling timing to superimpose the bitmap data of the subtitles on the image data on the basis of the display timing information.

A main feature of the present technology is to excellently perform display timing control of subtitles on a reception side by transmitting a subtitle stream having text information on the subtitles and display timing information together with a video stream (see FIG. 22).

REFERENCE SIGNS LIST

10 Transceiver system
100 Broadcast transmission system
110 Stream generation unit
111 Control unit
112 Video encoder
113 Audio encoder
114 Text format conversion unit
115 Subtitle encoder
116 TS formatter
200 Television receiver
201 Reception unit
202 TS analysis unit
203 Video decoder
204 Video superimposing unit
205 Panel drive circuit
206 Display panel
207 Audio decoder
208 Audio output circuit
209 Speaker
210 Subtitle decoder
221 CPU
231, 241 Coded buffer
232, 242 Subtitle segment decoder
233, 243 Font expansion unit
234 Bitmap buffer
300A, 300B Decoder buffer model
301, 311 Coded buffer
302, 312 Subtitle segment decoder
303, 313 Font expansion unit
304 Bitmap buffer

The invention claimed is:
1. A transmission apparatus, comprising:
a video encoder configured to generate a video stream having coded image data;
a subtitle encoder configured to generate a subtitle stream having text information and display timing information for subtitles, wherein:
the subtitle stream is constituted by a Packetized Elementary Stream (PES) packet constituted by a PES header and a PES payload, and
the PES payload includes the display timing information for the subtitles;
and
a transmission unit configured to transmit a transport stream containing the video stream and the subtitle stream,
wherein the text information for the subtitles in a format is one of a Timed Text Markup Language (TTML) or a derivative format of the TTML, and
wherein the subtitle encoder is further configured to:
convert the TTML into a plurality of segments; and set, when converting the TTML into the plurality of segments, a presentation time stamp (PTS), a display offset, and a display duration of each of the subtitles based on a start display timing and an end display timing of each corresponding subtitle of the subtitles.

2. The transmission apparatus according to claim 1, wherein the subtitle encoder is further configured to generate the subtitle stream based on the text information for the subtitles in a format having the display timing information.

3. The transmission apparatus according to claim 1, wherein the display timing information for the subtitles has information for, at least, display start timing and display duration.

4. The transmission apparatus according to claim 3, wherein:
the text information is in the PES payload, and
the display start timing is indicated by a display offset from a presentation time stamp (PTS) inserted in the PES header.

5. A transmission method, comprising:
a video encoding step of generating a video stream having coded image data;

a subtitle encoding step of generating a subtitle stream having text information and display timing information for subtitles, wherein:
the subtitle stream is constituted by a Packetized ElementaryStream (PES) packet constituted by a PES header and a PES payload, and
the PES payload includes the display timing information for the subtitles;
and
a transmission step of transmitting, by a transmission unit, a transport stream containing the video stream and the subtitle stream,
wherein the text information for the subtitles in the format is one of a Timed Text Markup Language (TTML) or a derivative format of the TTML, and
wherein the subtitle encoder is further configured to:
convert the TTML into a plurality of segments; and set, when converting the TTML into the plurality of segments, a presentation time stamp (PTS), a display offset, and a display duration of each of the subtitles based on a start display timing and an end display timing of each corresponding subtitle of the subtitles.

* * * * *